(12) United States Patent
Kaburlasos et al.

(10) Patent No.: US 10,025,367 B2
(45) Date of Patent: Jul. 17, 2018

(54) DYNAMIC SCALING OF GRAPHICS PROCESSOR EXECUTION RESOURCES

(71) Applicants: Nikos Kaburlasos, Lincoln, CA (US); Eric Samson, Folsom, CA (US)

(72) Inventors: Nikos Kaburlasos, Lincoln, CA (US); Eric Samson, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 347 days.

(21) Appl. No.: 14/463,573

(22) Filed: Aug. 19, 2014

(65) Prior Publication Data

US 2016/0054782 A1    Feb. 25, 2016

(51) Int. Cl.
*G06F 1/32* (2006.01)

(52) U.S. Cl.
CPC ............ *G06F 1/3234* (2013.01); *G06F 1/324* (2013.01); *G06F 1/3206* (2013.01); *G06F 1/3265* (2013.01); *G06F 1/3287* (2013.01); *G06F 1/3296* (2013.01); *Y02D 10/126* (2018.01); *Y02D 10/153* (2018.01); *Y02D 10/171* (2018.01); *Y02D 10/172* (2018.01)

(58) Field of Classification Search
CPC .... G06F 1/3234; G06F 1/3287; G06F 1/3296; G06F 1/3203
See application file for complete search history.

(56) References Cited

U.S. PATENT DOCUMENTS

| 8,243,085 | B2 | 8/2012 | Navale et al. |
| 8,386,808 | B2 | 2/2013 | Therien et al. |
| 8,607,083 | B2 | 12/2013 | Kaburlasos et al. |
| 8,806,243 | B2 | 8/2014 | Kaburlasos et al. |
| 9,037,889 | B2 | 5/2015 | Ananthakrishnan et al. |
| 9,269,120 | B2 | 2/2016 | Kaburlasos et al. |
| 9,400,545 | B2 | 7/2016 | Sodhi et al. |
| 2009/0096797 | A1* | 4/2009 | Du .............................. G06T 1/20 345/506 |
| 2010/0131787 | A1* | 5/2010 | White ................... G06F 1/3203 713/322 |
| 2010/0295852 | A1* | 11/2010 | Yang ..................... G06F 1/3203 345/426 |
| 2011/0060924 | A1 | 3/2011 | Khodorkovsky |

(Continued)

OTHER PUBLICATIONS

PCT/US2015/036398, "Notification of Transmittal of the International Search Report and the Written Opinion of the International Searching Authority, or the Declaration" dated Sep. 4, 2015, pp. 15.

(Continued)

*Primary Examiner* — Kim Huynh
*Assistant Examiner* — Brandon Kinsey
(74) *Attorney, Agent, or Firm* — Womble Bond Dickinson (US) LLP

(57) ABSTRACT

In one embodiment execution units, graphics cores, or graphics sub-cores can be dynamically scaled across a frame of graphics operations. Available execution units within each graphics core may be scaled using utilization metrics such as the current utilization rate of the execution units and the submission of new draw calls. In one embodiment, one of more of the sub-cores within each graphics core may be enable or disabled based on current or past utilization of the sub-cores based on a set of current graphics operations.

25 Claims, 19 Drawing Sheets

(56) References Cited

U.S. PATENT DOCUMENTS

| | | | |
|---|---|---|---|
| 2011/0291746 A1* | 12/2011 | Ibrahim | G06F 1/3206 |
| | | | 327/538 |
| 2012/0013627 A1* | 1/2012 | Shah | G06F 1/3203 |
| | | | 345/522 |
| 2012/0169747 A1 | 7/2012 | Kaburlasos et al. | |
| 2013/0198549 A1 | 8/2013 | Longnecker et al. | |
| 2013/0286026 A1 | 10/2013 | Kaburlasos et al. | |
| 2013/0328890 A1 | 12/2013 | Avkarogullari et al. | |
| 2014/0143564 A1* | 5/2014 | Tannenbaum | G06F 7/4876 |
| | | | 713/320 |
| 2014/0181561 A1 | 6/2014 | Shippy | |
| 2014/0359335 A1* | 12/2014 | Seo | G06F 1/3234 |
| | | | 713/324 |

OTHER PUBLICATIONS

Notification concerning transmittal of International Preliminary Report on Patentability for PCT/US2015/036398 dated Mar. 2, 2017, 12 pages.

\* cited by examiner

DYNAMIC SCALING OF GRAPHICS PROCESSOR EXECUTION RESOURCES

BACKGROUND

Field of the Disclosure

Embodiments are generally related to power management in integrated circuits, and more particularly to dynamic scaling of execution units on a graphics processor.

Description of the Related Art

Graphical output for a computer system is generally created using one or more graphics processors. Each graphics processor may include multiple graphics processor cores, and each graphics processor core may include multiple types of resources to perform various types of graphics operations. The various types of graphics operations utilize multiple types of graphics workloads, which each may use different resources within the graphics cores. For computationally intensive workloads, the graphics processor execution units are used extensively.

However, different graphics workloads utilize the execution units at different levels. Also, a particular graphics workload may utilize the execution units at varying levels over time while processing the graphics workload. Maintaining power to the graphics execution units introduces various costs to the computer system, including increased power dissipation and maximum load current. Accordingly, the computer system may benefit by reducing the number of active execution units during times of low utilization. However, reducing the number of active execution units reduces the execution resources available to graphics operations. Thus, existing mechanisms for scaling execution units may harm overall system performance.

BRIEF DESCRIPTION OF THE DRAWINGS

The following description includes discussion of figures having illustrations given by way of example of implementations of the various embodiments. The figures should be understood by way of example and not by way of limitation.

DETAILED DESCRIPTION

Various embodiments of a system and method are disclosed which dynamically scale execution units in a graphics processor to reduce the power dissipation and maximum current draw without significantly affecting performance. The graphics processor may dynamically enable or disable execution units using utilization metrics such as the current execution unit utilization rate. The graphics processor may additionally use the submission of new draw calls from a 3D application or the receipt of new draw calls by the graphics processor as an indication of possible high execution unit utilization in the near future. By anticipating high execution unit utilization, the proposed technique can power manage the execution units dynamically without affecting performance during high graphics processor utilization.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments.

Although some of the following embodiments are described with reference to a processor, similar techniques and teachings can be applied to other types of circuits or semiconductor devices, as the teachings are applicable to any processor or machine that performs data manipulations.

Figure 1:
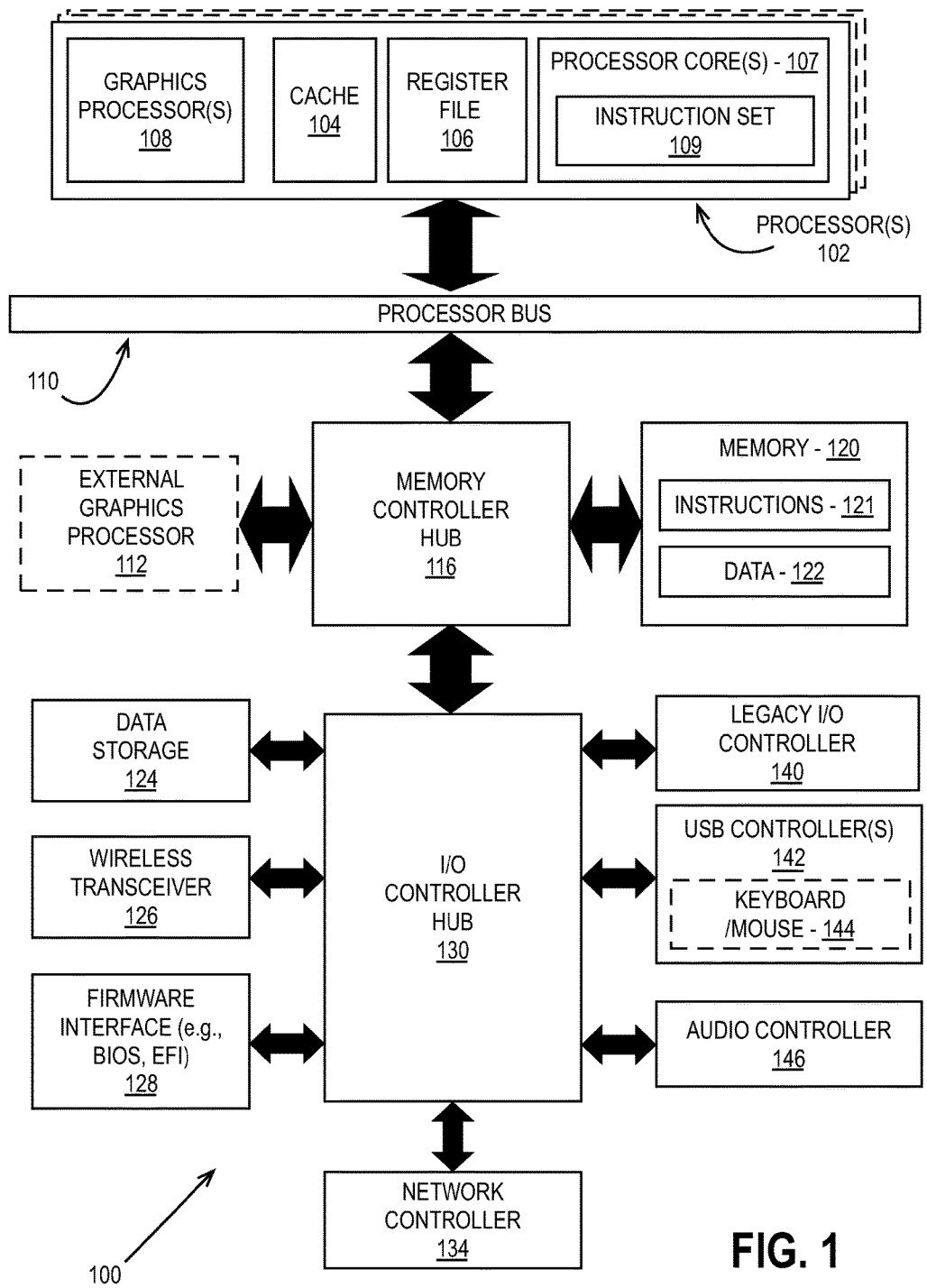
FIG. 1 is a block diagram of an embodiment of a computer system with a processor having one or more processor cores and graphics processors.
Figure 2:
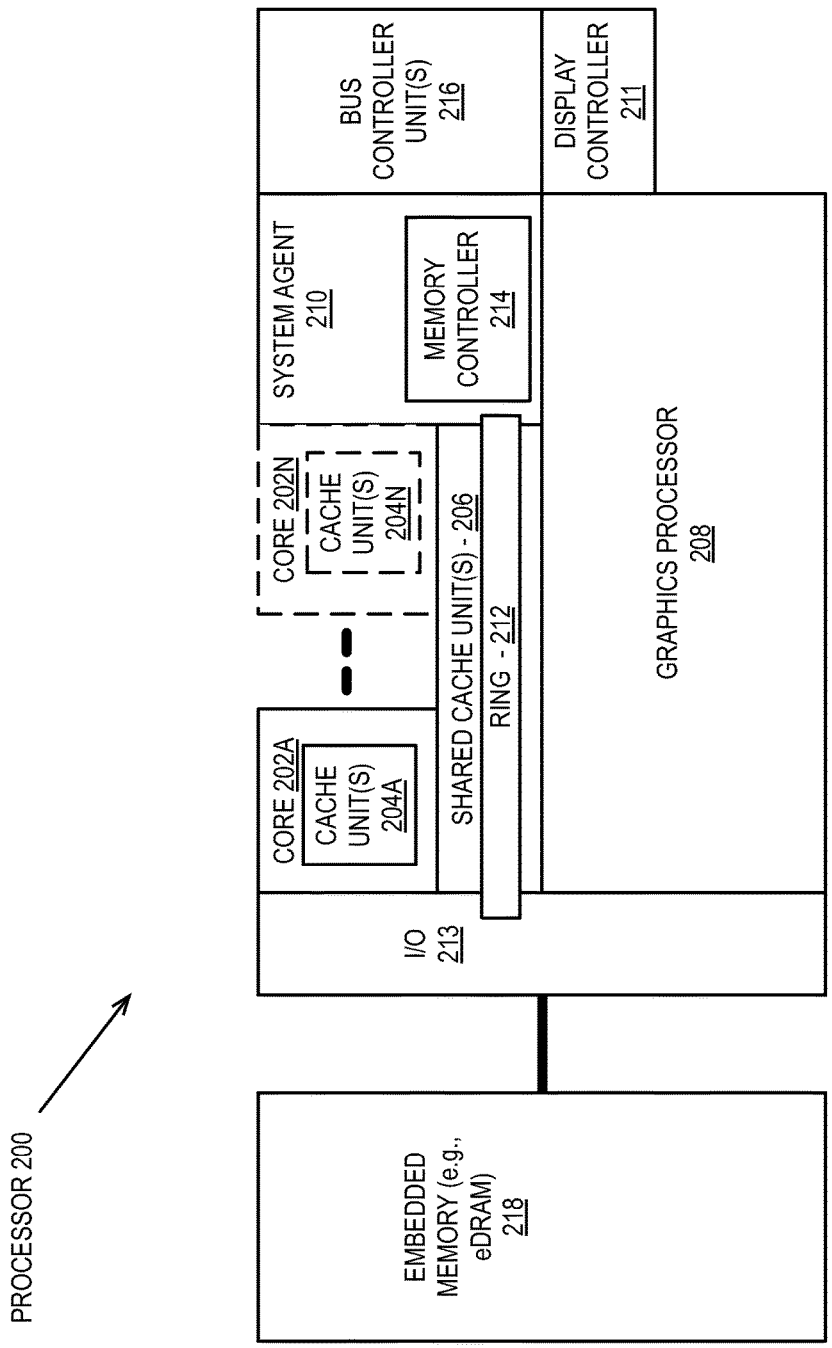
FIG. 2 is a block diagram of one embodiment of a processor having one or more processor cores, an integrated memory controller, and an integrated graphics processor.
Figure 3:
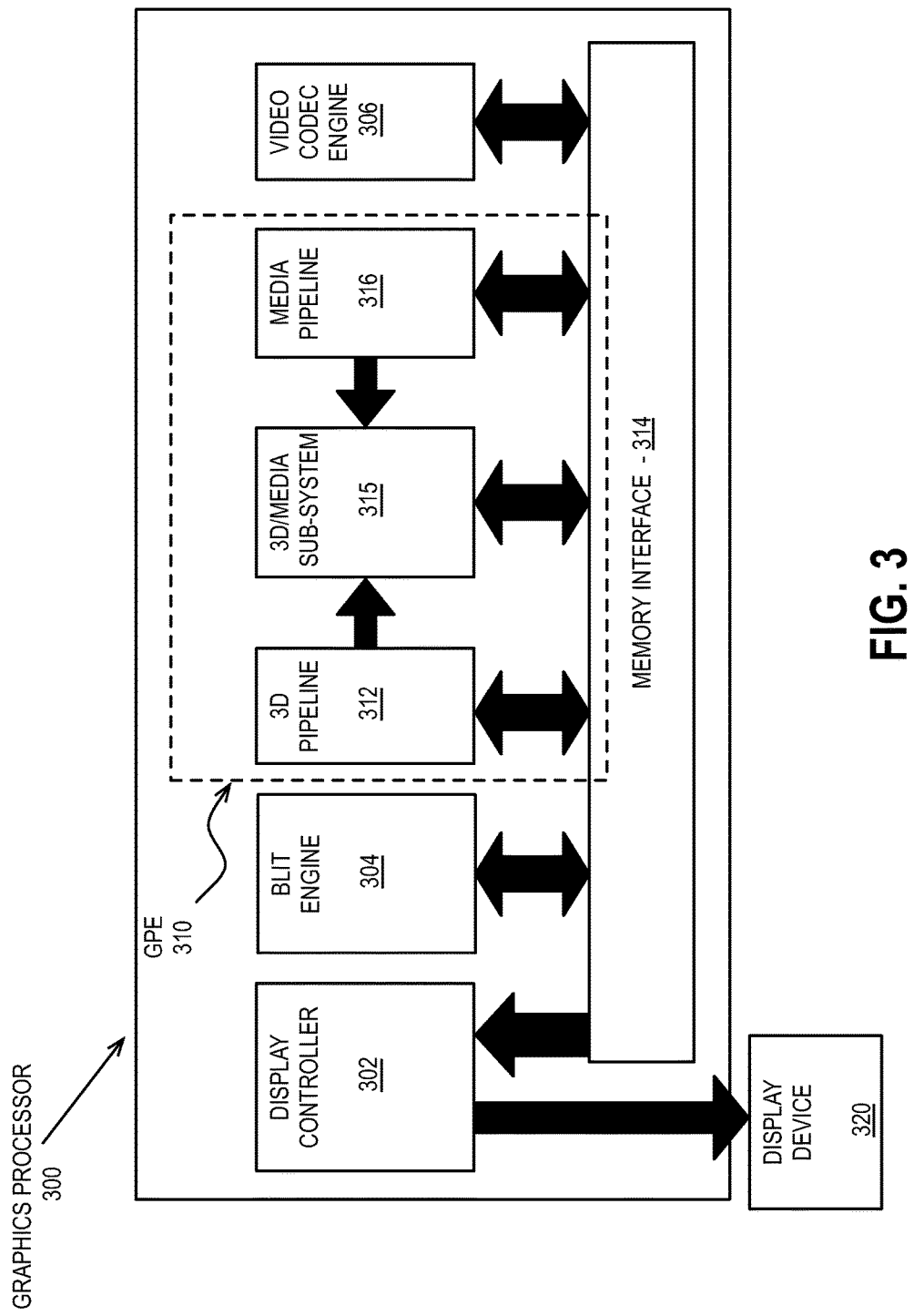
FIG. 3 is a block diagram of one embodiment of a graphics processor which may be a discreet graphics processing unit, or may be graphics processor integrated with a plurality of processing cores.

Overview—FIGS. 1-3

FIG. 1 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include or be incorporated within a server based gaming platform or a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, each of the one or more processors 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processor 108 in the processor 102 to perform graphics and media operations. The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 2 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 3 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 4:
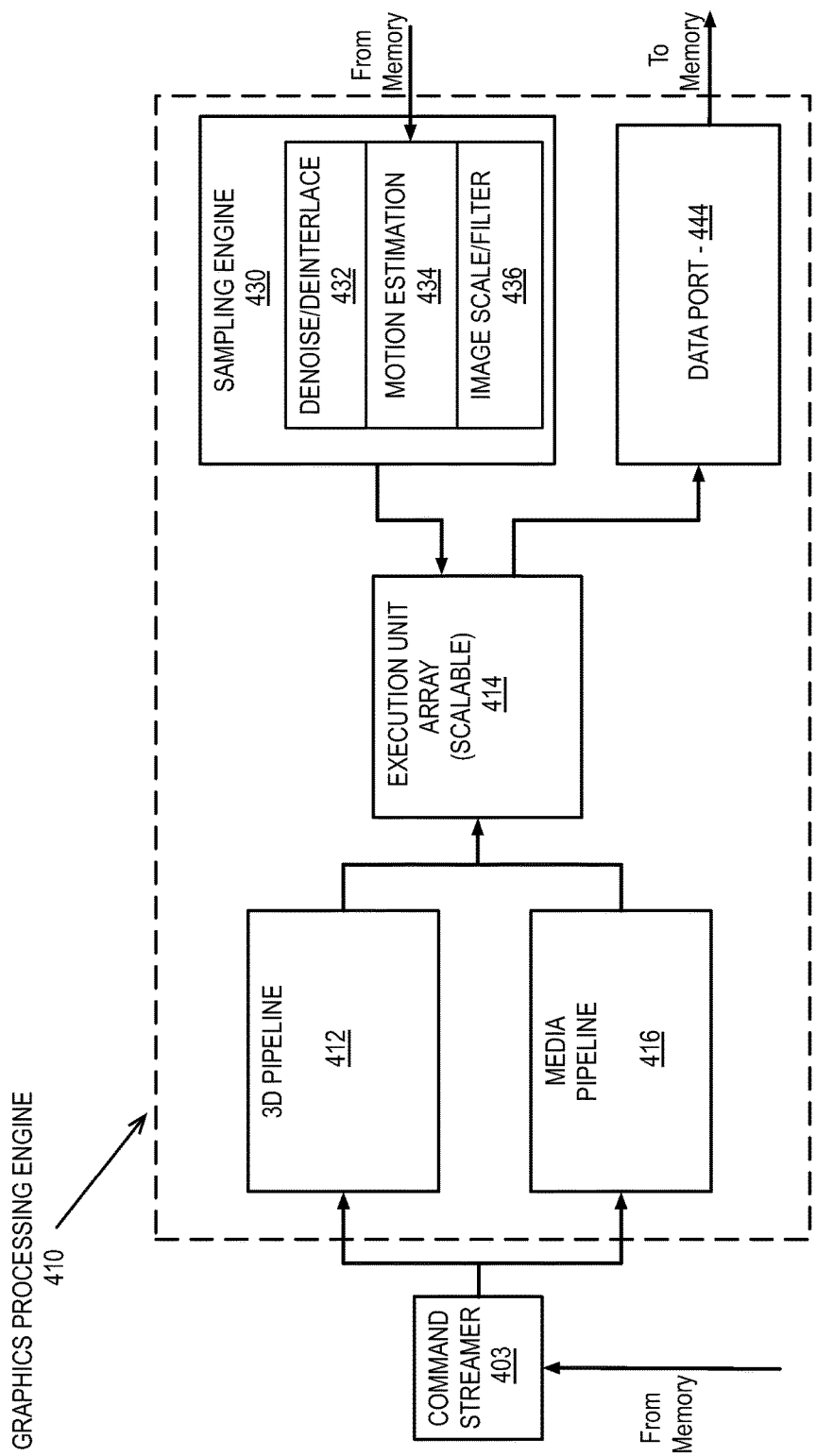
FIG. 4 is a block diagram of an embodiment of a graphics-processing engine for a graphics processor.

3D/Media Processing—FIG. 4

FIG. 4 is a block diagram of an embodiment of a graphics processing engine 410 for a graphics processor. In one embodiment, the graphics processing engine (GPE) 410 is a version of the GPE 310 shown in FIG. 3. The GPE 410 includes a 3D pipeline 412 and a media pipeline 416, each of which can be either different from or similar to the implementations of the 3D pipeline 312 and the media pipeline 316 of FIG. 3.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 5:
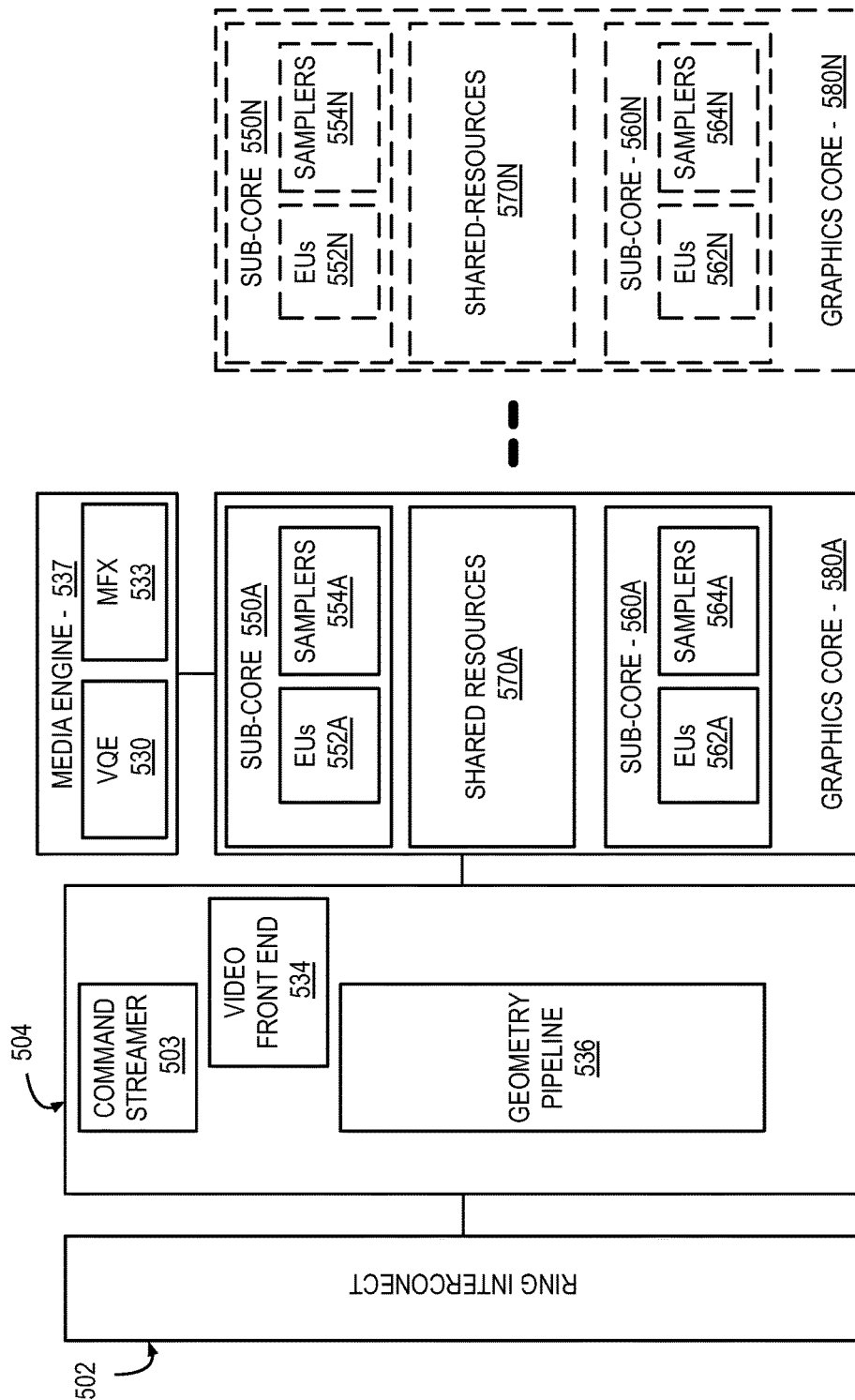
FIG. 5 is a block diagram of another embodiment of a graphics processor.
Figure 6:
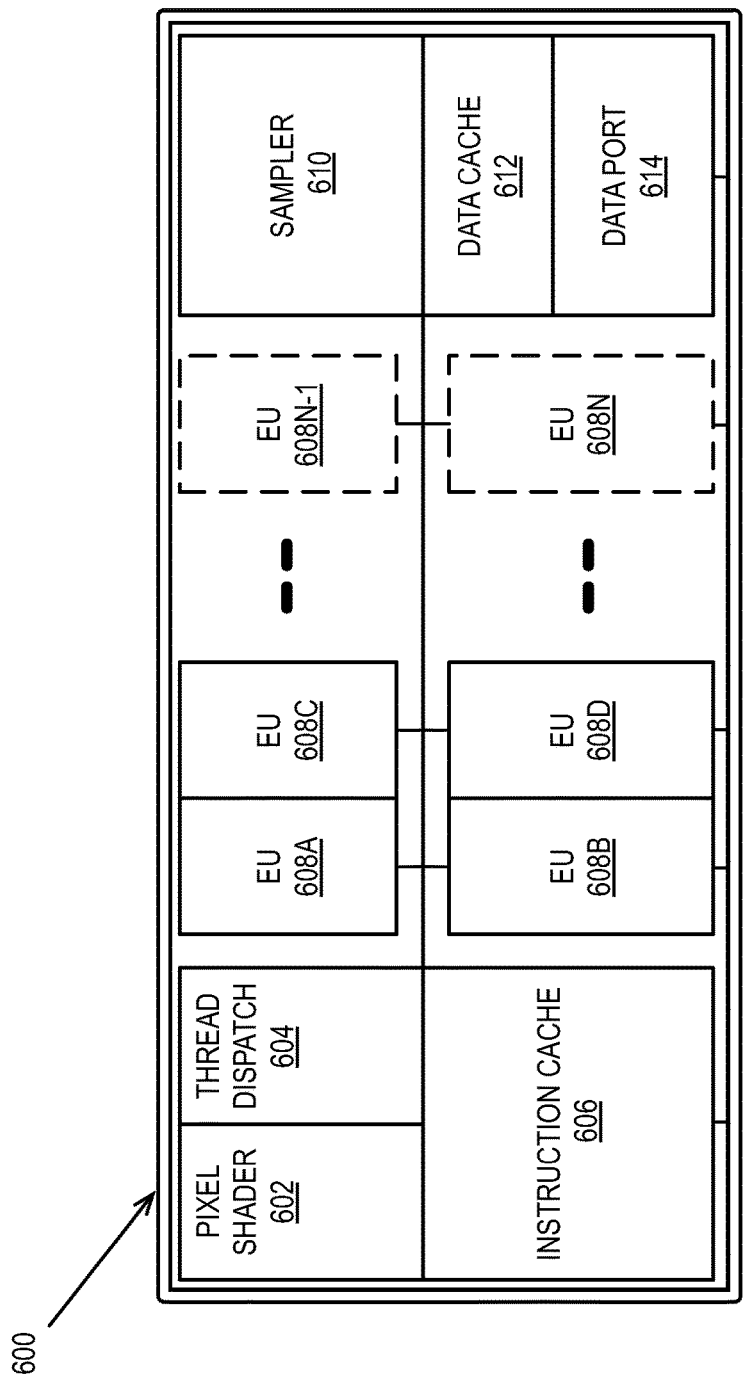
FIG. 6 is a block diagram of thread execution logic including an array of processing elements.
Figure 7:
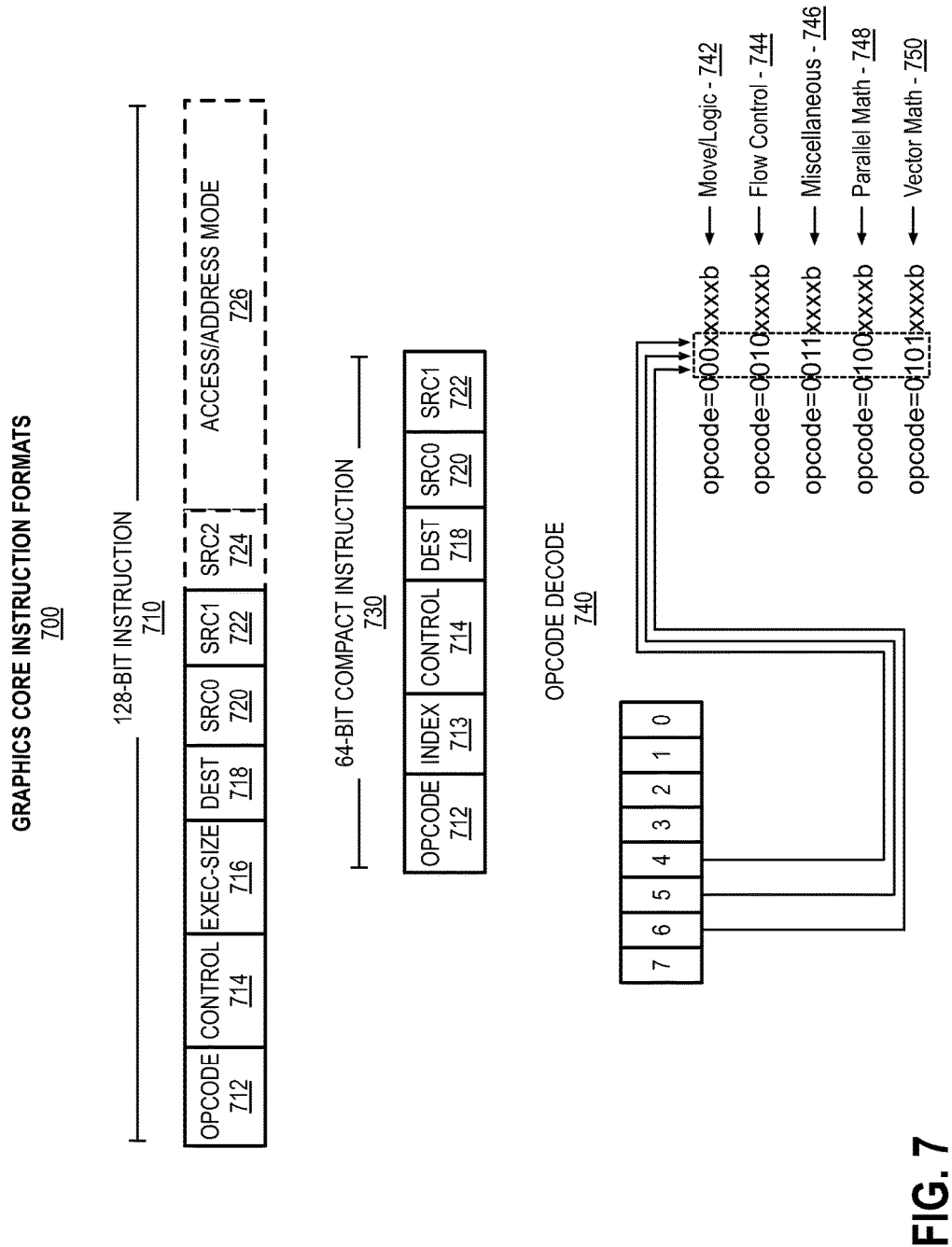
FIG. 7 illustrates a graphics processor execution unit instruction format according to an embodiment.

Execution Units—FIGS. 5-7

FIG. 5 is a block diagram of another embodiment of a graphics processor having a scalable number of graphics cores. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 6 illustrates an embodiment of thread execution logic 600 including an array of processing elements. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical arithmetic logic units (ALUs) or floating-point units (FPUs) for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 7 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 722, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
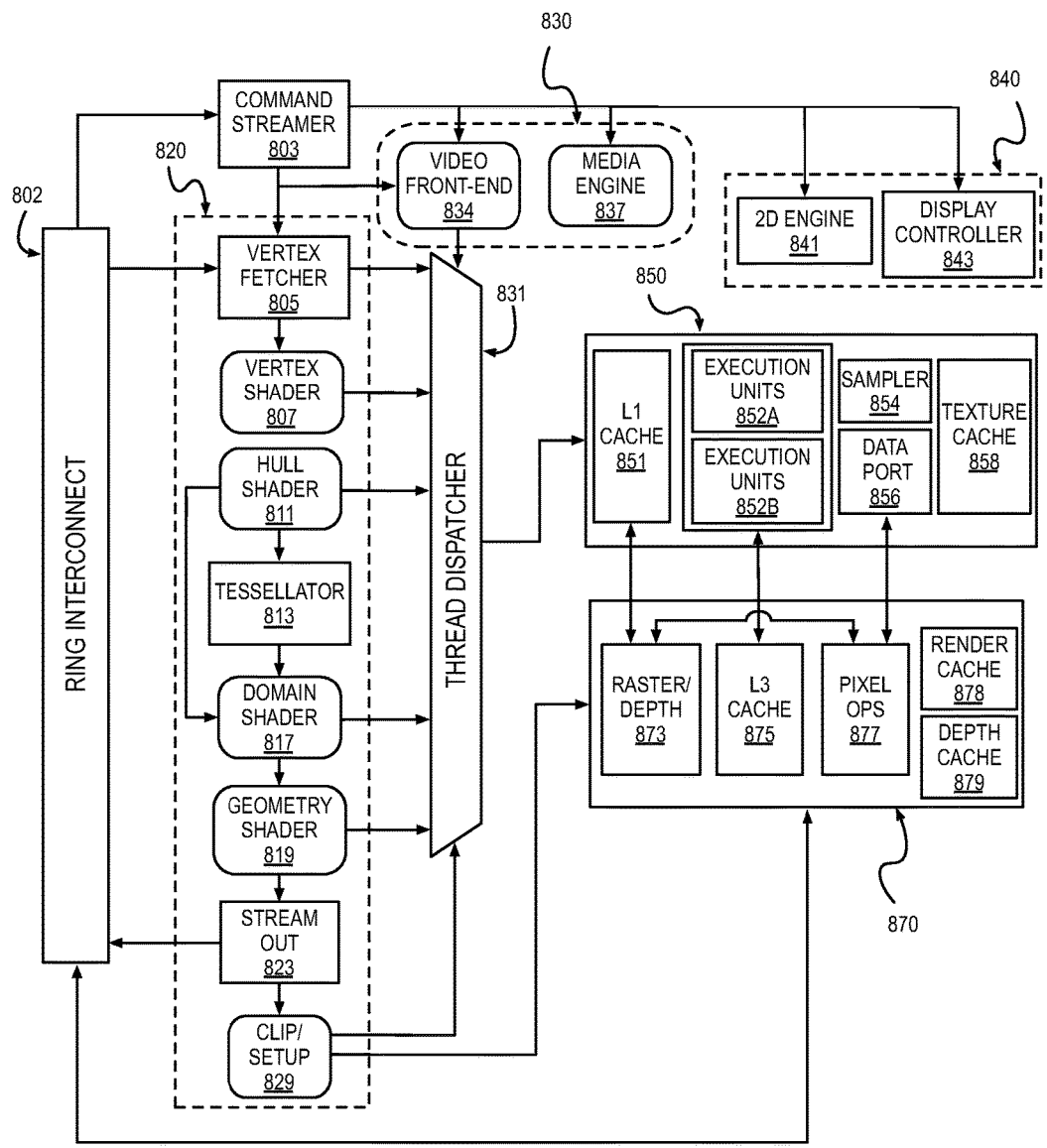
FIG. 8 is a block diagram of another embodiment of a graphics processor.

Graphics Pipeline—FIG. 8

FIG. 8 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 337 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 9:
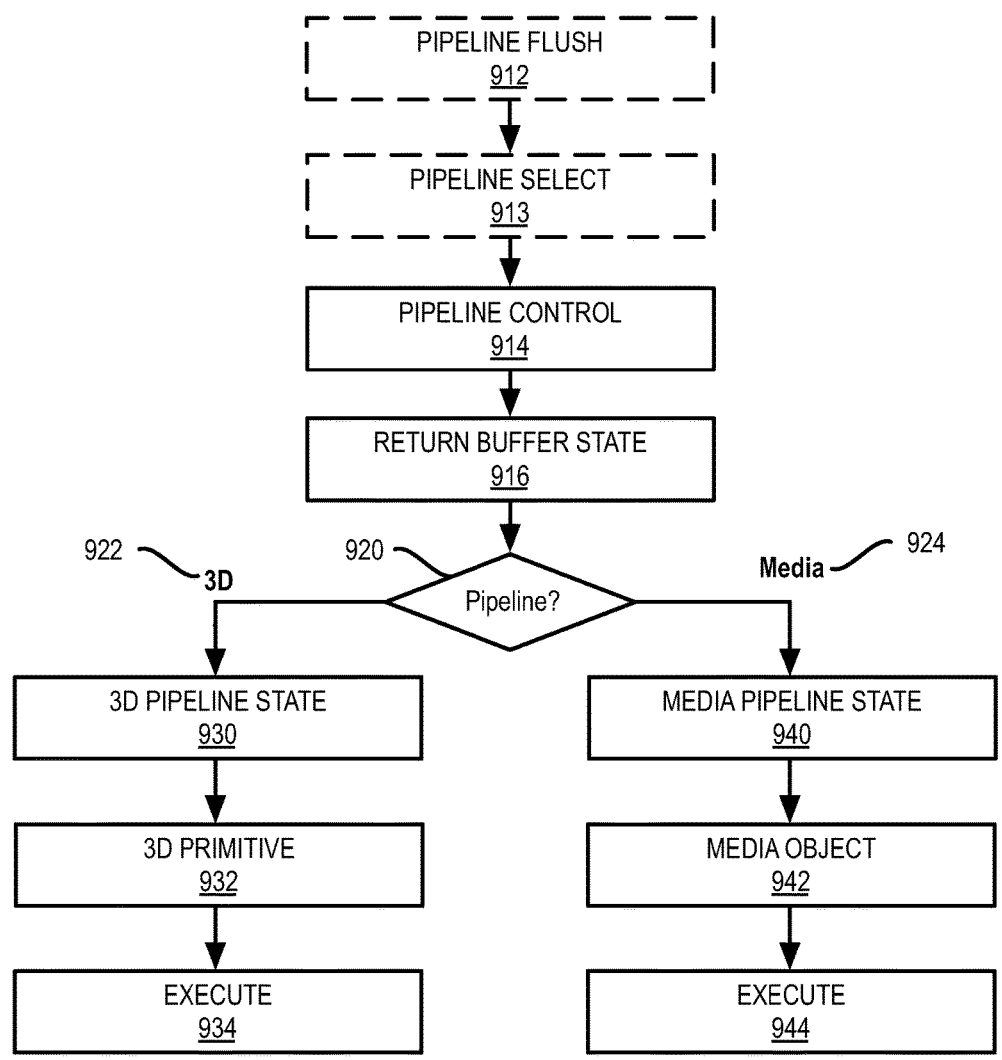
FIG. 9A is a block diagram illustrating a graphics processor command format according to an embodiment.
FIG. 9B is a block diagram illustrating a graphics processor command sequence according to an embodiment.

Graphics Pipeline Programming—FIG. 9A-B

FIG. 9A is a block diagram illustrating a graphics processor command format according to an embodiment and FIG. 9B is a block diagram illustrating a graphics processor command sequence according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 9B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 10:
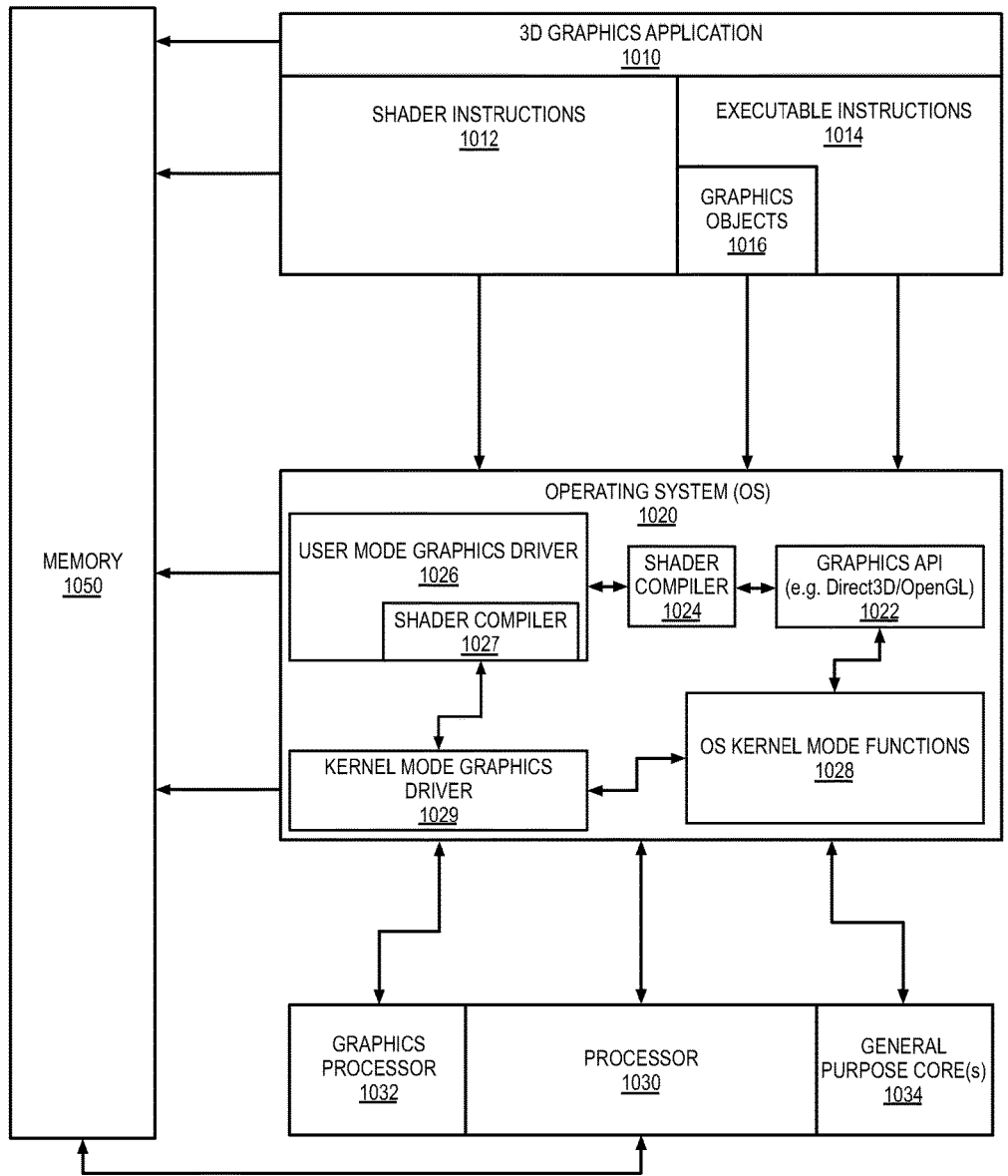
FIG. 10 illustrates exemplary graphics software architecture for a data processing system according to an embodiment.

Graphics Software Architecture—FIG. 10

FIG. 10 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a WINDOWS™ operating system available from the Microsoft Corporation of Redmond, Wash., a proprietary UNIX operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

An article of manufacture in the form of a non-transitory machine readable storage medium can store instructions to cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be accessed via one or more commands or signals, and may be configured by providing commands including configuration parameters, or by sending signals to prepare the communication interface to provide a data signal describing the software content.

Dynamic Scaling of Graphics Processor Execution Resources—FIGS. 11-21

The graphics operations processed within a single frame can include various graphics workloads that use some graphics processor resources more heavily than other resources, or use some resources more heavily over time. In some circumstances, such as when graphics core execution resources are under-utilized, the execution resources may be 'scaled down' without negatively impacting performance. In other words, one or more instances of the resource can be power gated, leaving a smaller number of instances active and available to service the workload. The power-gated resources may be powered up again at a later time, when the workload utilizes the said resource more heavily.

Embodiments of the graphics processors described herein include power management logic to dynamically enable or disable graphics executing resources during a frame. In one embodiment the power management logic scales graphics execution units within each graphics core. In one embodiment, the power management logic power manages the power state of graphics cores or sub-cores (e.g., core slices or sub-slices) during a frame of graphics processing. In one embodiment, the power management logic manages the power state of the execution units within the graphics sub-cores. In one embodiment, the graphics execution resources scale dynamically based on utilization. In one embodiment, the graphics execution resources scale in response to an event such as receiving a new draw call from a graphics API, receiving a new batch of commands (e.g., a batch buffer), or receiving a pipeline flush command (e.g., pipeline flush 912 of FIG. 9B).

The discussion that follows refers to 'scaling down' and 'scaling up' a resource. Scaling down execution resources means a number of execution units, graphics cores, or graphics sub-cores are power gated. Scaling up execution resources means powering on (e.g., power ungating) a number of execution units, graphics cores, or graphics sub-cores.

Figure 11:
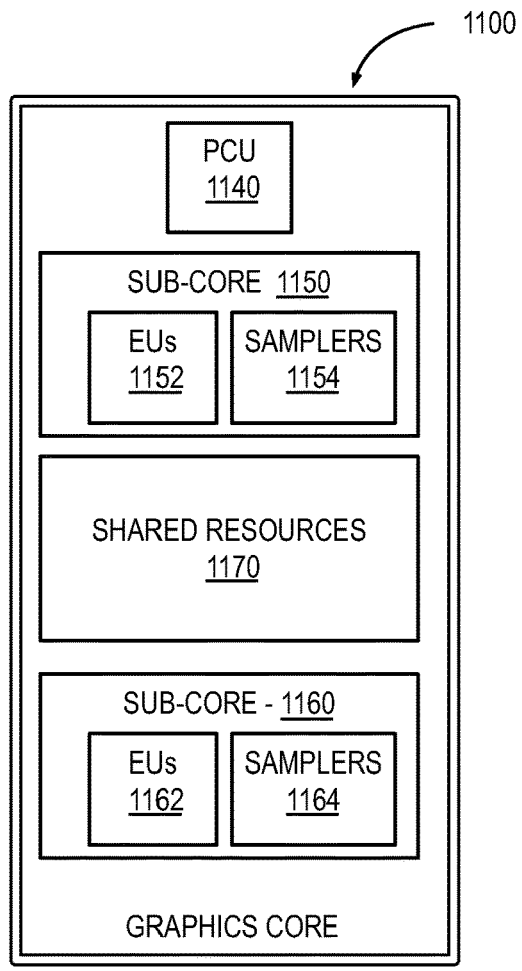
FIG. 11 is a block diagram of a graphics core including scalable resources and a power control unit, according to an embodiment.

FIG. 11 is a block diagram of a graphics core 1100 including scalable resources and a power control unit (PCU) 1140, according to an embodiment. In one embodiment, a graphics processor includes one or more of instances of graphics processor core 1100, which may be a version of one of the graphics cores 580A-N of FIG. 5. The graphics core 1100 includes a first sub-core 1150 and second sub-core 1160, each of which may be power gated by the PCU 1140. The first sub-core 1150 includes EUs 1152 and samplers 1154. The second sub-core 1160 includes EUs 1162 and samplers 1164. In one embodiment, each sub-core 1150, 1160 includes a variant of the execution resources 600 shown in FIG. 6, including a scalable array of EUs 608A-N. An exemplary scalable EU array includes eight EUs, of which, two, four, or six may be power gated by the PCU 1140 during operation. In one embodiment the sub-cores 1150, 1160 each couple with a set of shared resource 1170, which include one or more shared caches and pixel processing logic.

The power control unit (PCU) 1140 can be configured to manage the scaling of the execution units, the scaling of graphics cores, or the scaling of graphics sub-cores. While the PCU 1140 is shown within the graphics core 1100, the power control logic may reside in a logic module that is external to the graphics core, or entirely external to the GPU, such as in the processor system agent 210 shown in FIG. 2. The internals of the PCU 1140 are shown in further detail in FIG. 12.

While one graphics processor core and two sub-cores are shown, a GPU can also include two or more graphics cores, with each graphics core including three or more sub-cores. Alternatively, one or more sub-cores may be omitted or disabled when manufacturing GPU variants configured exclusively for low power operation.

Figure 12:
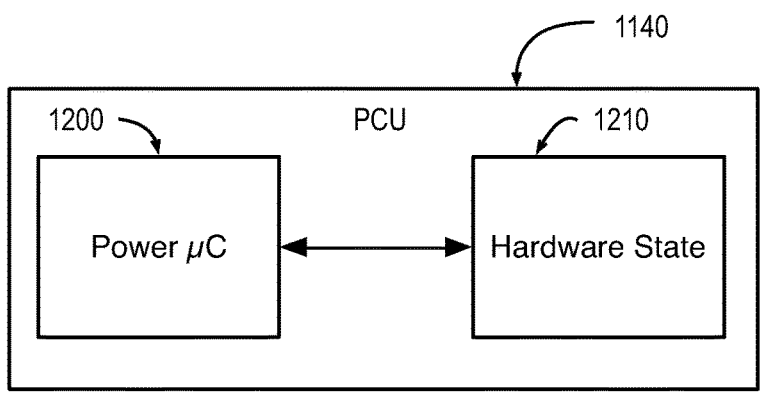
FIG. 12 is a block diagram of a power control unit to control power to graphics core execution units, according to an embodiment.

FIG. 12 is a block diagram of a power control unit 1140, according to an embodiment. In one embodiment, the power control unit 1140 includes a power management microcontroller 1200 configured to control the adjustment of various power management parameters for the graphics core 1100. The power management parameters include the current hardware state 1210, which is used to determine whether to scale up or down the execution resources by enabling or power gating a number of EUs.

In one embodiment, the hardware state 1210 includes data from a set of hardware activity counters that are used to track resource utilization with each core or sub-core and flag windows within a given frame of graphics processing when power gating may be possible without affecting performance, such as when utilization drops below a threshold. The hardware state may also include information such as a current Batch Buffer ID number or a pipeline flush ID number, the types of textures in use, or any other information used during the power gating logic operations described below.

The power gating of under-utilized graphics resources can enable reduced graphics processor power dissipation (e.g., leakage power). The reduced power dissipation enables reduced power consumption within battery-operated devices without decreasing system performance. Under some circumstances, the reduced power dissipation may enable increased performance by allowing the clock frequency of active graphics resources to be increased, enabling an increase in performance without exceeding a specified power budget.

Dynamic Scaling of Execution Units Across Active Sub-Cores

In some embodiments, reducing the number of active EUs causes a decrease in the graphics processor maximum current load (e.g., $ICC_{max}$). The decrease in the graphics processor maximum current load (e.g., $ICC_{max}$) may enable an increase in graphics processor frequency without exceeding limits imposed by a power budget. While fewer EUs are active, the active EUs can execute at a higher frequency. Accordingly, the dynamic scaling of execution units can provide a measurable performance benefit, in some instances, for $ICC_{max}$ limited products when performing graphics workloads that are not limited by execution resources.

However, for graphics workloads that extensively utilize execution resources a significant reduction in performance may be realized during scaled down operations. Experimental results for EU scaling indicate that EU utilization maintains a similar shape and profile across EU scaling modes, although per EU utilization is higher when the EUs are scaled down and operations take longer to complete. However, operations on scaled down configurations realize a significantly greater performance penalty relative to scaled up configurations during periods of high EU utilization because the scaled down GPU offers fewer computational resources to executing operations. Additionally, reducing execution resources may result in extended periods of high EU utilization, which may limit power savings resulting from scaling down execution resources.

Figure 13:
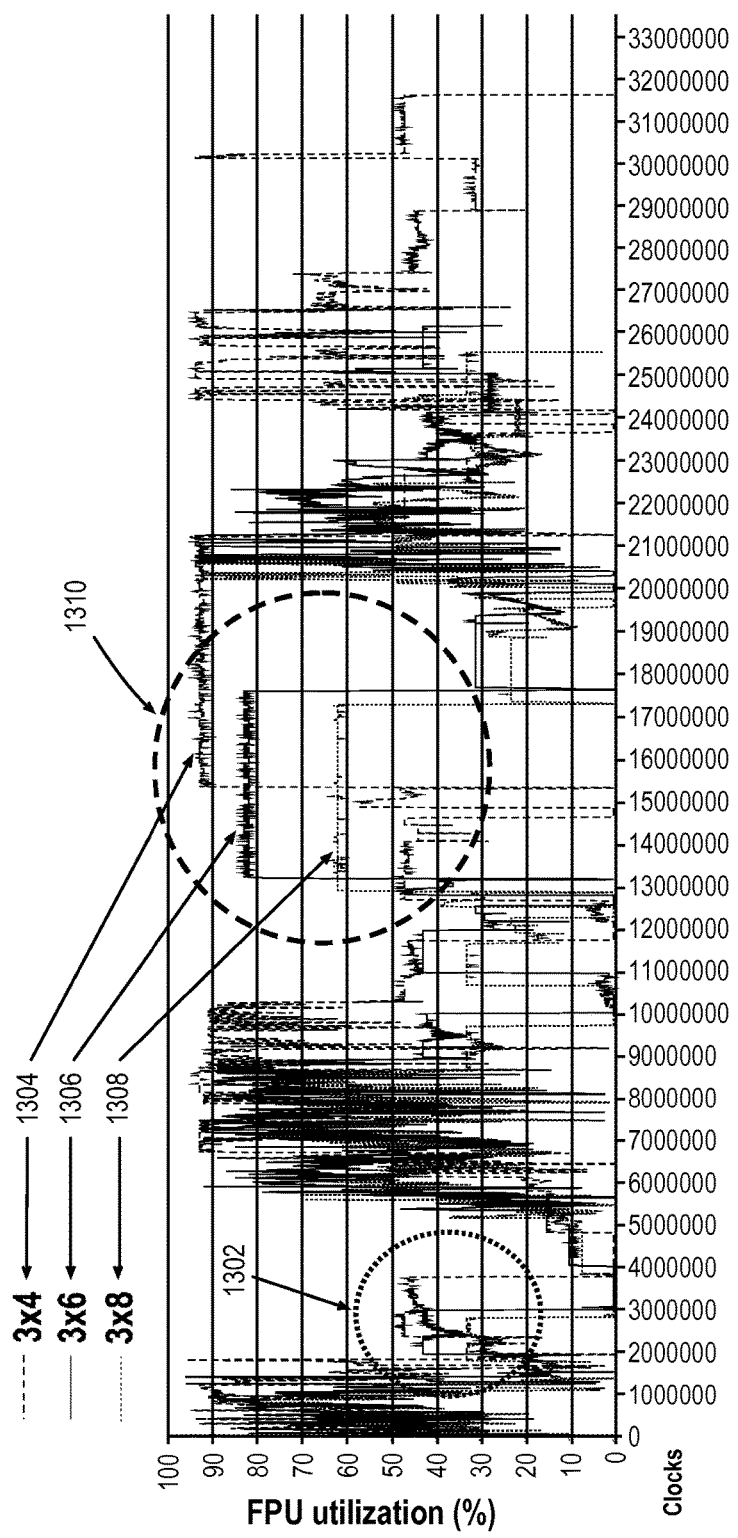
FIG. 13 is a graph of utilization for the execution units (EUs) of three exemplary graphics processor cores.

FIG. 13 is a graph of utilization for the execution units (EUs) of three exemplary graphics processor cores during a frame of a gaming application. Each of the three graphics processor unit (GPU) cores includes three sub-cores (sometimes referred to as core sub-slices). Each of the sub-cores has 8 or 6 or 4 EUs for a total of 24 or 18 or 12 EUs respectively. The EU utilization in the exemplary graph is computed based on the number and type of instructions which are executed on the EU floating point units and is averaged over 10,000 clocks, i.e. each point of each curve in figure represents average EU utilization over 10,000 clocks. A dashed line represents the utilization 1304 of the 3×4 GPU core, a solid line represents the utilization 1306 of the 3×6 GPU core, and a dotted line represents the utilization 1308 of the 3×8 GPU core.

It can be seen, for example in graph region 1302 and 1310, that the utilization of the three GPUs has a similar 'shape' (highs and lows) in all three cases. However, the utilization curves of the GPUs with fewer execution resources are shifted in time relative to the utilization curves of the GPUs having a greater amount of execution resources. While each GPU executes the same workload, the GPUs having fewer execution resources require a longer processing period for each workload. Moreover, the utilization curve of the GPU having the fewest execution resources experiences a significantly greater time shift, indicating a continuing performance penalty after each period of high utilization (e.g. higher than 70%-80%). Accordingly, embodiments of the graphics processors described herein employ an EU scaling system configured to prevent scenarios in which the GPU execution resources are significantly under-sized relative to the currently GPU workload.

During periods of high EU utilization the number of active EUs may be scaled up to provide additional execution resources to executing graphics applications. The additional resources may provide improved graphics performance. However, the graphics operations executing during the scale-up transition period may continue to realize reduced performance until the additional EUs are active. To address the transition performance penalty the number of EUs may be pre-emptively scaled up based on leading indicators for upcoming periods of high EU utilization.

Figure 14:
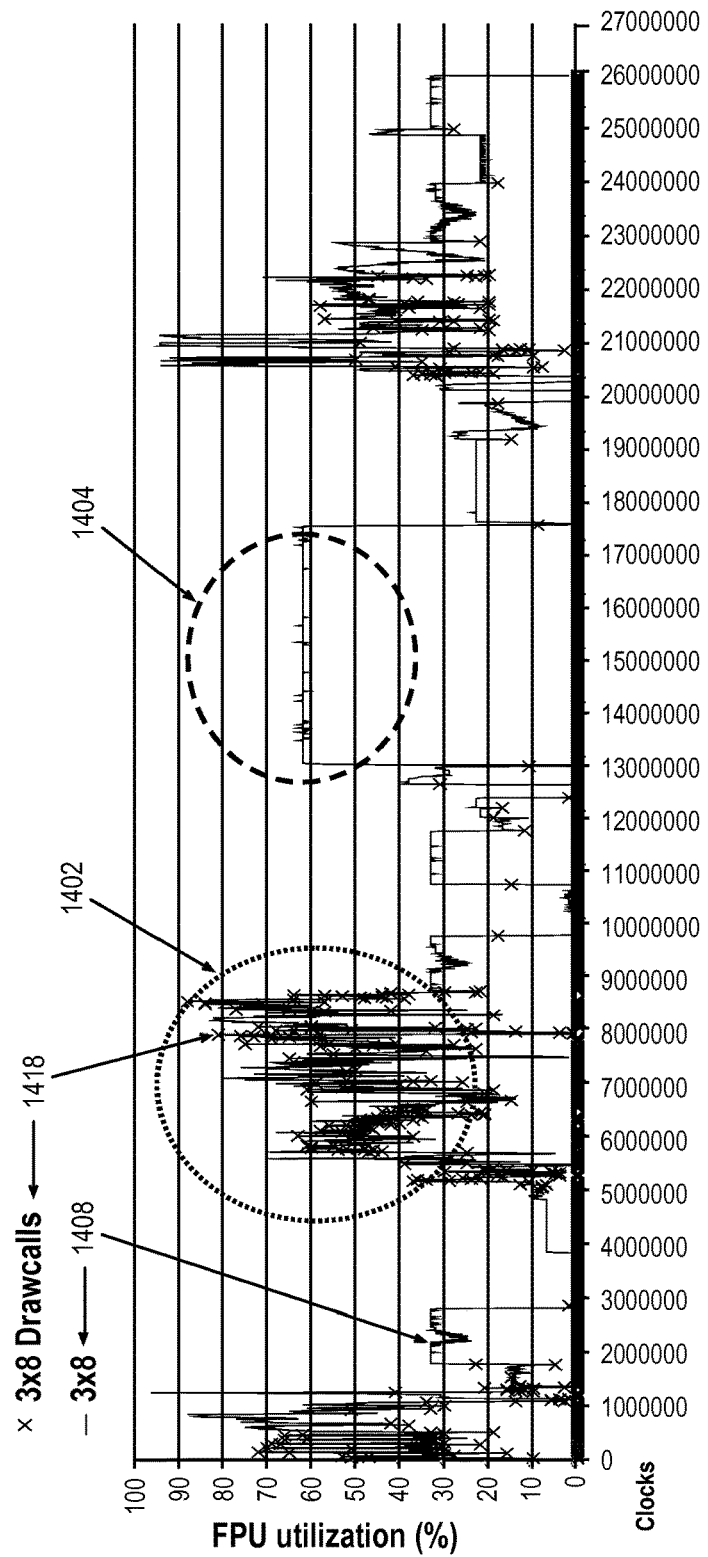
FIG. 14 is a graph of utilization for the exemplary 3×8 GPU which highlights the submission of new draw calls.

FIG. 14 is a graph of utilization for the exemplary 3×8 GPU which highlights the submission of new draw calls. The utilization 1408 is shown as a solid line for the 3×8 GPU and correlates with the utilization 1308 for the 3×8 GPU in FIG. 13. Each 'x' 1418 along the 3×8 utilization 1408 indicates the submission of one or more new draw calls to the GPU during the last 10,000 clocks. With each new drawcall the EUs are caused to perform operations to process new workloads. Accordingly, new drawcalls generally correlate with an increase in EU utilization. For example, within graph region 1202 a large number of new drawcalls are submitted and utilization as high as 80%-90% is observed. This contrasts with graph region 1204, in which no new drawcalls are received by the GPU and utilization remains steady. Accordingly, at least one embodiment uses the submission of new draw calls to the GPU as an indication of an impending period of high EU utilization.

Figure 15:
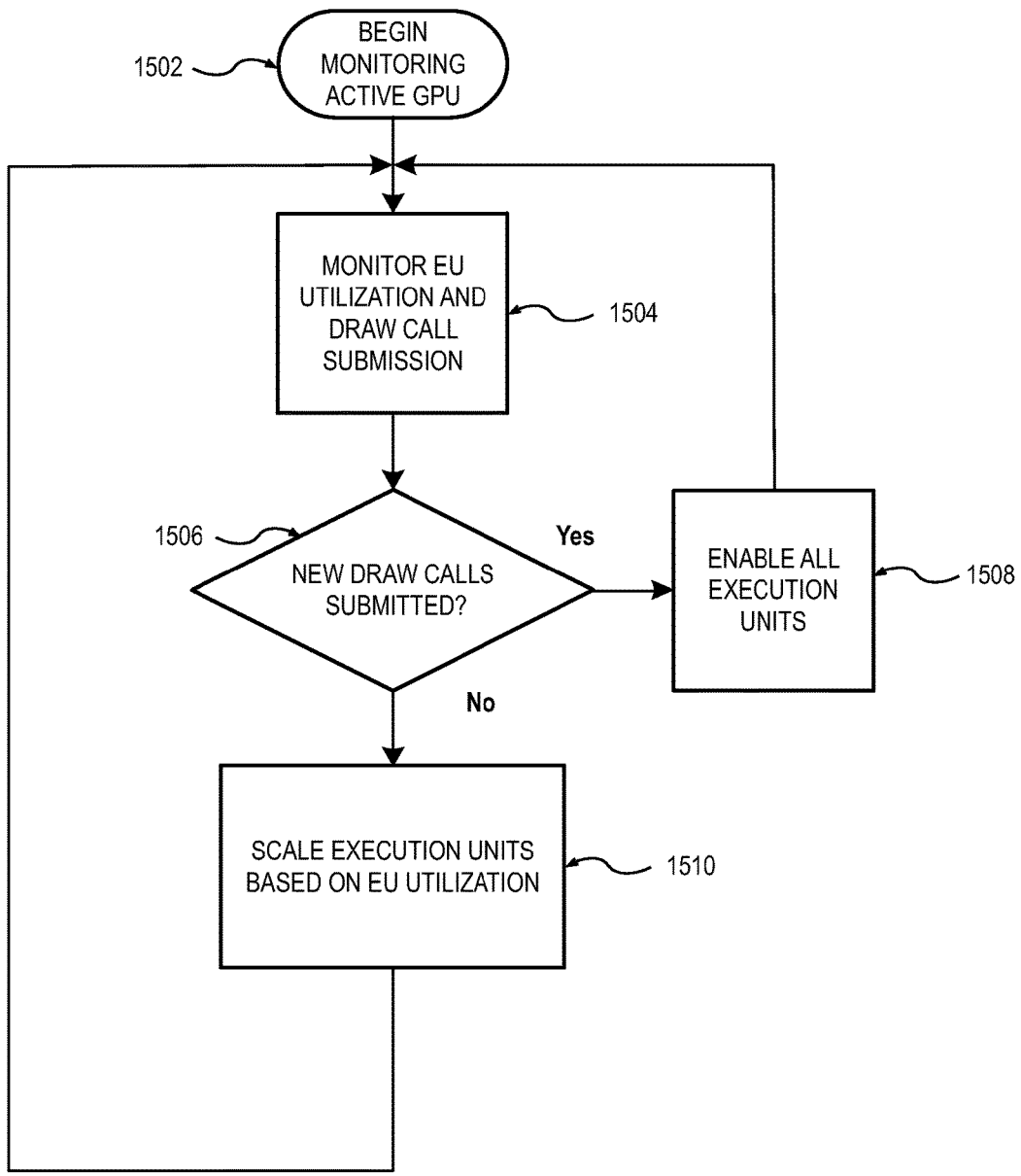
FIG. 15 is a flow diagram of logic to manage the scaling of graphics processor execution units, according to an embodiment.

FIG. 15 is a flow diagram of logic to manage the scaling of graphics processor execution units, according to an embodiment. A power unit (e.g., PCU 1140 of FIG. 12) can be configured to monitor an active GPU, as shown at block 1502. The power unit monitors parameters including EU utilization and draw call submissions, as shown at block 1504. In one embodiment the GPU is configured to output performance statistics regarding EU utilization, which can be computed based on the number and type of instructions that are executed on the floating-point units (FPUs) of the EUs over a period of time. In one embodiment, the performance statistics are reported via a set of performance counters provided by the GPU. In one embodiment, the period is 10,000 clocks, although the period can vary by embodiment. Peak and average utilization may both be used to determine overall EU utilization. In one embodiment, the GPU is configured to output a hardware signal that flags the submission of new draw calls to the hardware. The signal may assert once for every new draw call submitted to the GPU or for every group of new draw calls submitted within a number of clocks. In one embodiment, a software graphics driver for the GPU can indicate the imminent submission of new graphics operations.

The power unit periodically determines whether new draw calls have been submitted, as shown at block 1506. When no new draw calls are detected, the power unit scales the EUs based on current EU utilization, as shown at block 1510. However, when the power unit detects that new draw calls have been submitted, a signal is sent to the GPU to enable all available EUs as shown at block 1508. Once all EUs are enabled, the monitor can return to monitoring EU utilization and draw call submission at block 1504.

While the submission of draw calls to the GPU generally indicates impending periods of high EU utilization, it is possible that a draw call submission will not lead to a high EU utilization period. Accordingly, the scaled up EUs may be subsequently scaled down if no period of high utilization results from the draw call submission. In one embodiment, a more detailed algorithm using a monitor window and a decision window can accurately evaluate and scale execution resources based on current and predicted EU utilization. During each monitor window, EU utilization statistics are collected. At the end of a decision window, a state machine or an embedded power-management microcontroller, such as power microcontroller 1200 of FIG. 12, evaluates the statistics that have been collected. The microcontroller can then determine whether to scale up or down the EUs. The microcontroller algorithm is discussed in more detail in FIGS. 16-17.

Figure 16:
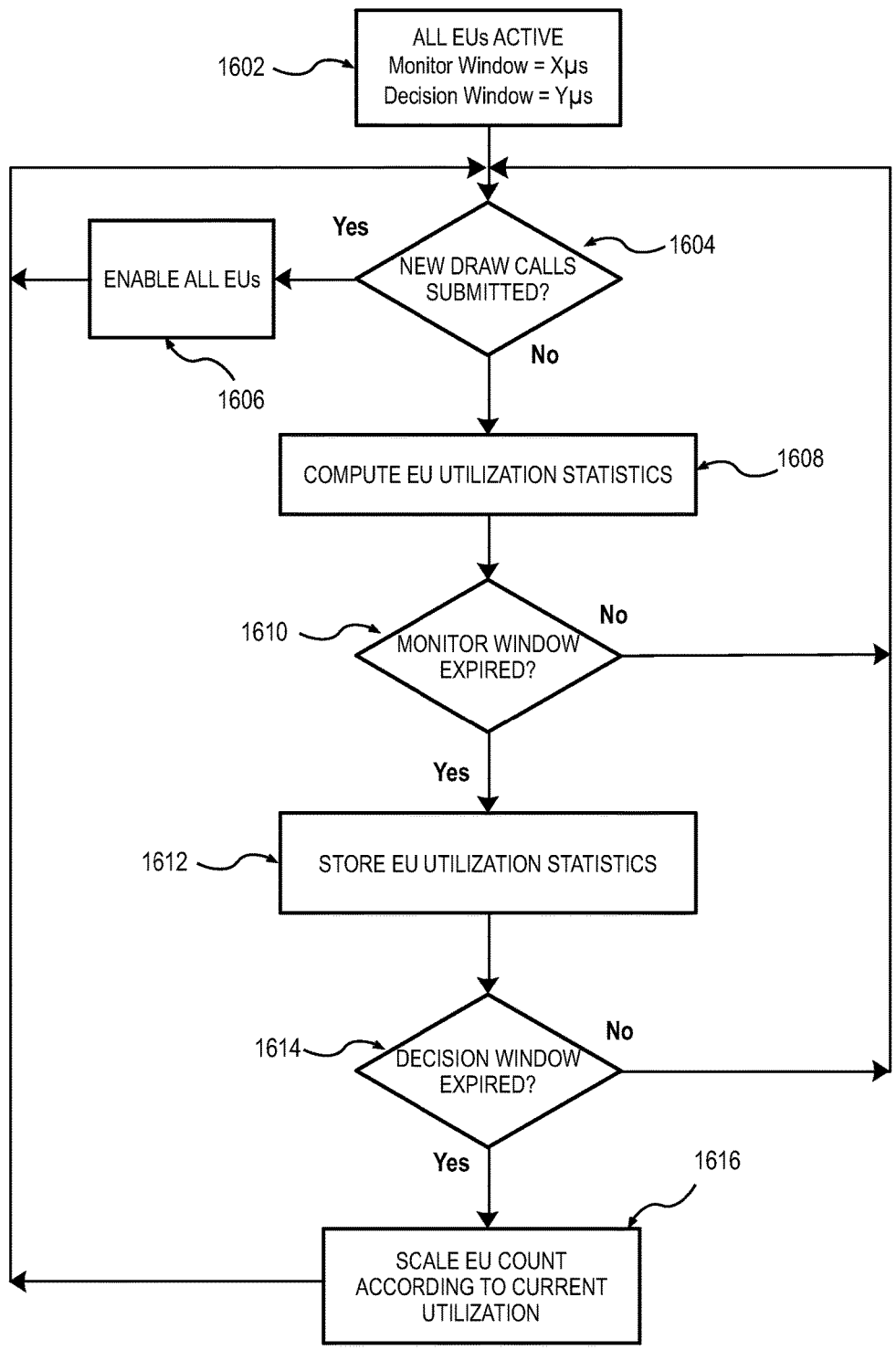
FIG. 16 is a flow diagram of additional logic to manage the scaling of execution units by a power controller, according to an embodiment.

FIG. 16 is a flow diagram of additional logic to manage the scaling of execution units by a power controller, according to an embodiment. In one embodiment, a 'monitor' window of X microseconds (µs) and a 'decision' window of Y µs are defined, as shown at block 1602. The values of X and Y may be predetermined or runtime configurable. An exemplary monitor window X is 50 µs and an exemplary decision window Y is 500 µs. However, the values associated with the monitor and decision windows may be larger or smaller, or may have the same value. In general, a smaller monitor window value relative to the decision window value enables the collection of EU utilization data with a higher degree of granularity, which allows the detection of short duration peaks in utilization.

As shown at block 1604, a monitor and decision cycle can begin with a determination of whether new draw calls or other relevant graphics operations have been submitted. As shown at block 1606, if new draw calls have been submitted then all available EUs are activated without regard to the current utilization level. The activation of all EUs when a draw call is received may reduce the risk of unexpectedly receiving a computationally intense workload while execution resources are scaled down. If no new draw calls have been submitted to the GPU, the current EU utilization statistics are computed, as shown at block 1608. In one embodiment, EU utilization statistics are computed throughout the monitor window until the monitor window expires, as shown at block 1610. If the monitor window has expired the EU utilization statistics are stored, as shown at block 1612, and a check is made to determine if the decision window has expired, as shown at block 1614.

In one embodiment, if it is determined at block 1614 that the current decision window has expired, a decision is made to scale execution resources up or down by enabling (e.g., power un-gating) or power gating EUs, as shown at block 1616. In one embodiment, the hardware latencies associated with the EU scaling shown at block 1616 imposes a minimum limit on the Y value associated with the duration of the decision window, which is defined as shown at block 1602 above. In one embodiment, the execution pipelines of the EUs selected for power gating are allowed to complete. Additionally, the GPU frequency may be programmed to a higher or lower value to match the $ICC_{max}$ limit associated with the enabled set of EUs. Accordingly, the minimum duration for the decision window may be limited by the latencies associated with enabling and disabling EUs. Some embodiments may be configured to expire decision windows no often than every several hundred microseconds.

After each decision window the power controller may scale the EU count according to the stored EU utilization statistics, as shown at block 1616. An algorithm or scaling policy may be employed to select a number of EUs to activate or deactivate during the next decision window based on both peak and average utilization over the last decision window. An exemplary EU scaling algorithm is shown in FIG. 17.

Figure 17:
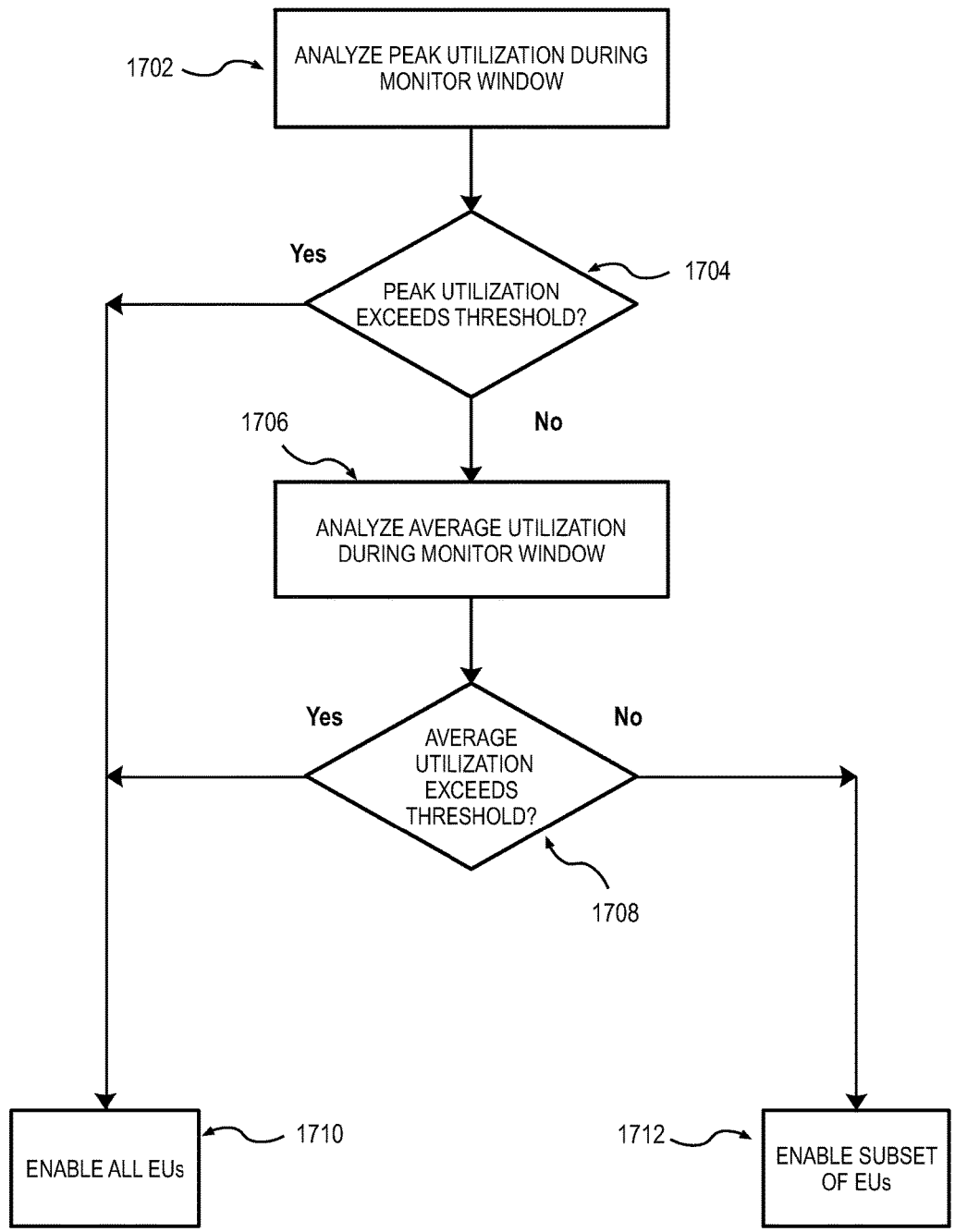
FIG. 17 is a flow diagram of logic to determine scale factors for graphics execution resources according to an embodiment.

FIG. 17 is a flow diagram of logic to determine scale factors for graphics execution resources according to an embodiment. The scaling algorithm can be configured to consider various data elements within the utilization statistics gathered by the power controller, including peak utilization, as shown at block 1702, and average utilization during, as shown at block 1706. At block 1702 the power controller analyzes peak utilization and determines, as shown at block 1704, whether peak utilization has exceeded a determined threshold over the last monitor window within the decision window. Multiple monitor windows may be included within each decision window and the scaling algorithm can be configured to consider peak and average utilization across the multiple monitor windows. In one embodiment, if analysis at block 1702 indicates that peak utilization exceeded 80%, for example, within at least two of the monitor windows within the current decision window, the power controller can enable all EUs, as shown at block 1710.

Likewise, if the utilization statistics indicates, at block 1706, that the average utilization exceeds a determine threshold, as shown at block 1708, the power controller can enable all EUs, as shown at block 1710. In one embodiment, if average utilization over the one or more monitor windows exceeds 60%, all EUs are enabled. However, the precise thresholds for peak and average utilization may be determined dynamically per workload and the thresholds for scaling up and down execution resources can vary. When the analysis of the utilization statistics indicate that neither the peak, nor the average thresholds set for the decision window have been exceeded, the power controller can enable only a subset of the EUs during the next decision window, as shown at block 1712.

The subset of EUs that are enabled may result in a scaling down of EU resources and the power gating of a subset of the EUs. Alternatively, if EU utilization has been low over the previous decision windows, the current EU utilization may cause EU resources to be scaled up, even if only a subset of the EUs are enabled. In one embodiment, experimental results indicate that a utilization rate of below 20% indicates that some execution resources are in use (e.g., the entire GPU, core, or sub-core should not be powered off), but a scaled down set of EUs may be sufficient to satisfy the needs of the currently execution graphics operations. However, when utilization consistently exceeds 60%, it would be beneficial to enable all available EUs. An exemplary mapping between utilization and EU scaling is shown in Table 1 below, which corresponds to a graphics core having multiple sub-cores, where each sub-core includes an array of 8 EUs. The precise relationship between utilization and EU scaling can vary between embodiments.

TABLE 1

Exemplary Sub-Core EU Scaling

| Average Utilization | Active Execution Units |
|---|---|
| >60% | 8 |
| >40% | 6 |
| >20% | 4 |
| <=20% | 2 |

Dynamic Scaling of Cores and Sub-Cores

The number of graphics cores or sub-cores (e.g., slices or sub-slices) within a graphics processor can be adjusted statically or semi-statically based on expected graphics processor workload, where workloads requiring more compute or texture filtering resources may be allowed to utilize the maximum number of graphics cores or sub-cores available, whereas workloads which require fewer resources may be allowed to power off a number of cores or sub-cores to reduce the power dissipated by the GPU. For static adjustment the determination of the number of cores or sub-cores to use is taken at the start of the workload or at the start of each frame of the workload. For example, for light workloads, such as when executing a casual game that does not require the extensive use of graphics resources, a number of cores or sub-cores may be power gated at the start of a frame.

In one embodiment, graphics processors are also configured to dynamically scale the number of cores or sub-cores within a graphics-processing frame based on the changing characteristics of a frame, enabling the GPU to operate with a higher or lower number of cores or sub-cores in different portions of each frame, which additionally reduces power dissipation without reducing performance. Portions of the following discussion uses the terms core and sub-core interchangeably, as, in one embodiment, the scalability concepts that described apply equally to dynamic core or sub-core scaling.

Figure 18:
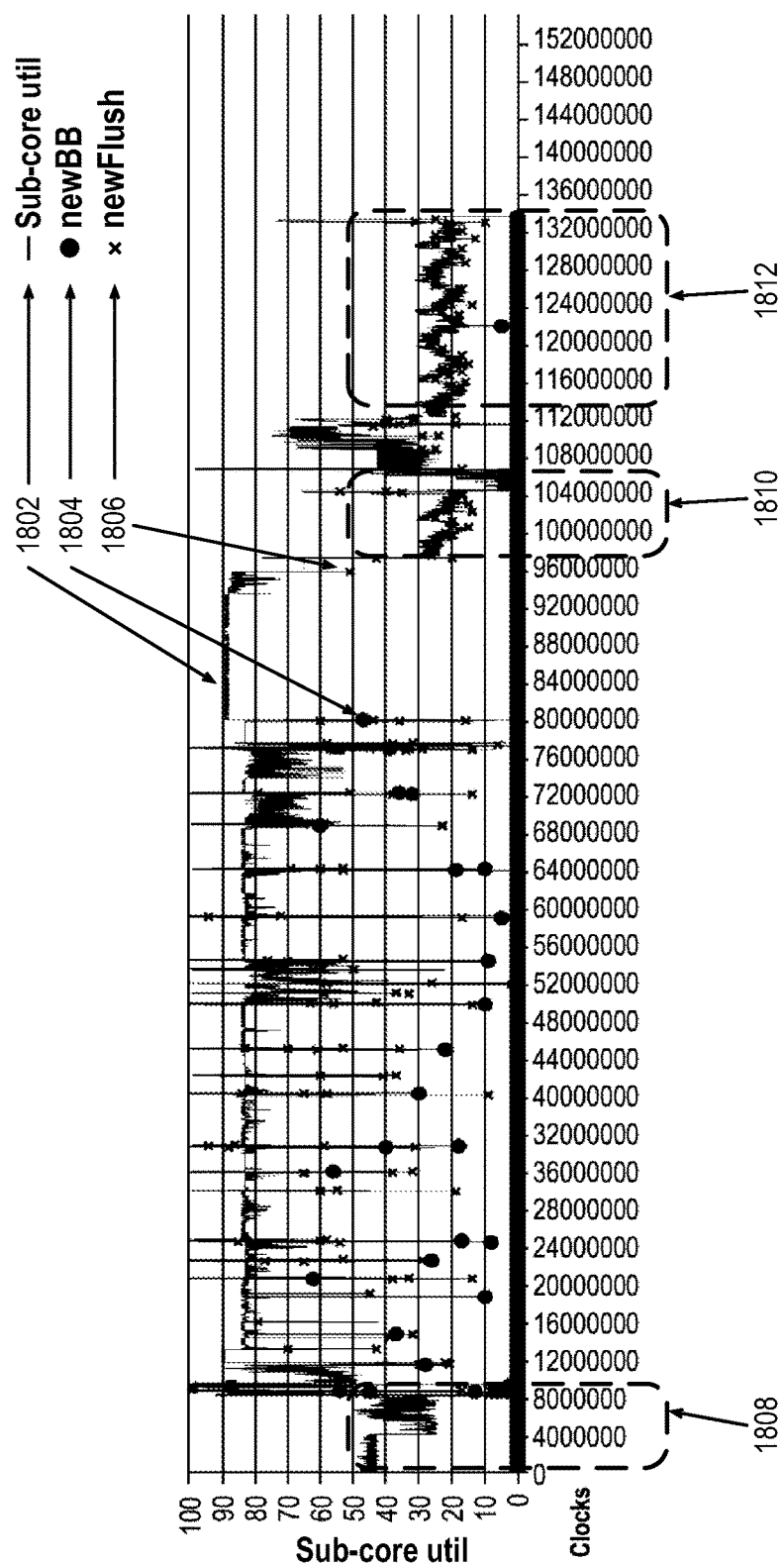
FIG. 18 is a graph of exemplary graphics sub-core utilization.

FIG. 18 is a graph of exemplary graphics sub-core utilization 1802 while processing a frame of a 3D graphics application. The utilization 1802 shown for the each sub-core includes the utilization for execution resources, texture processing resources, pixel processing resources, and other resources provided by the sub-core. The exemplary graphics sub-core utilization shown indicates that graphics sub-core (and graphics core) utilization may vary dynamically during a frame. For example, graph regions 1808, 1810, and 1812 each show windows in which utilization is generally below 50%. In all, utilization is lower during approximately one third of the total processing time for the frame. Embodiments of graphics processors described herein may power-gate at least one of multiple graphics sub-cores or cores within the graphics processor during these windows of lower utilization to reduce power consumption without negatively impacting performance. In one embodiment, hardware activity counters are used to track core or sub-core utilization and flag the windows within a frame when power gating is possible without affecting performance (e.g., when utilization drops below a certain threshold, as in graph regions 1808, 1810, 1812). The hardware activity counters can track utilization metrics for the execution resources, texture processing resources, pixel processing resources, or other resources provided by the sub-core.

However, it may not be possible to power gate or ungate graphics core or core-slices at arbitrary points during a frame. While graphics processor execution units (e.g., EUs) may be enabled and disabled more freely within a frame, each graphics core or sub-core may include resources (e.g., cache resources, texture samplers, etc.) that are used by other cores or sub-cores. Additionally, each core or sub-core may contain active threads that should not be interrupted before the operations within the thread are complete.

The exemplary graph of FIG. 18 indicates instances during the frame in which the graphics sub-core processes a new batch buffer (e.g., new BB 1804) or a new pipeline flush (e.g., newFlush 1806). In one embodiment, the each new batch buffer 1804 or new flush 1806 represents an instance in which the GPU may scale up or down a core or sub-core. When a new batch buffer 1804 is processed, the graphics sub-core is to begin processing a group of commands that are to be processed at least partially concurrently, where several commands are to be executed in parallel. When a pipeline flush 1806 command is processed any active graphics pipelines will complete all currently pending commands. Accordingly, new batch buffer 1804 and new flush 1806 instances during frame processing represent clean operational boundaries in which graphics cores and sub-cores may be disable or enabled (e.g., power gated or ungated). Thus, in addition to dynamically scaling execution resources by disabling or enabling EUs within each graphics core or sub-core, embodiments of the graphics processors described herein include logic to disable or enable graphics cores or sub-cores at operational boundaries, to dynamically scale graphics processor resources while processing a frame of graphics operations.

In addition to scaling graphics processor resources based on graphics core, sub-core or EU resources within a specific window during graphics operations, embodiments of the graphics processors described herein include additional logic to predict upcoming periods of utilization. As described above, upcoming periods of high EU utilization can be correlated with new draw calls. Additionally, the pattern of graphics core utilization within a single frame of graphics operations for a graphics application may be correlated with the pattern of graphics core utilization within successive frames of the same graphics application. Accordingly, embodiments include predictive logic to anticipate windows of low utilization and power gate or ungate resources at appropriate batch buffer or pipeline flush boundaries near the start or end of the windows of low utilization. The predictive logic is to further refine the power management operations to prevent impacting overall performance during periods downscaled graphics execution resources by reduce instances in which the graphics processor is under-resourced for a currently executing workload.

Figure 19:
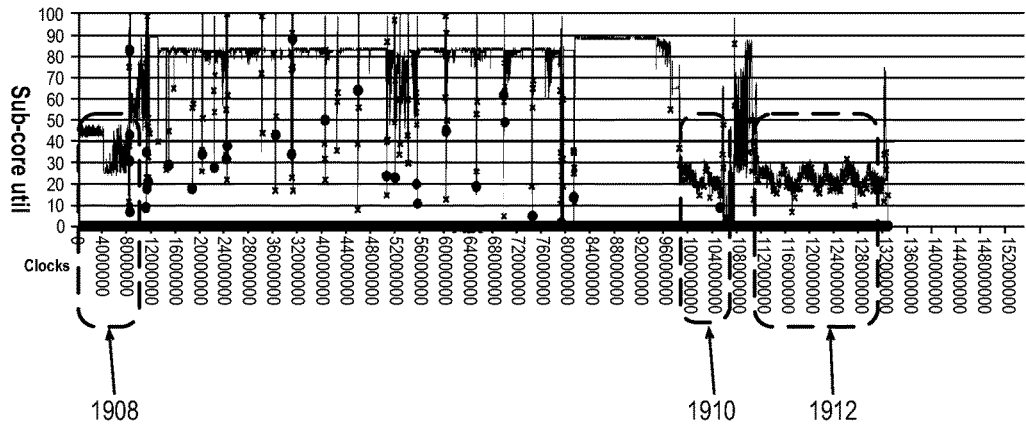
FIG. 19-20 are additional graphs of exemplary graphics sub-core utilization.
Figure 20:
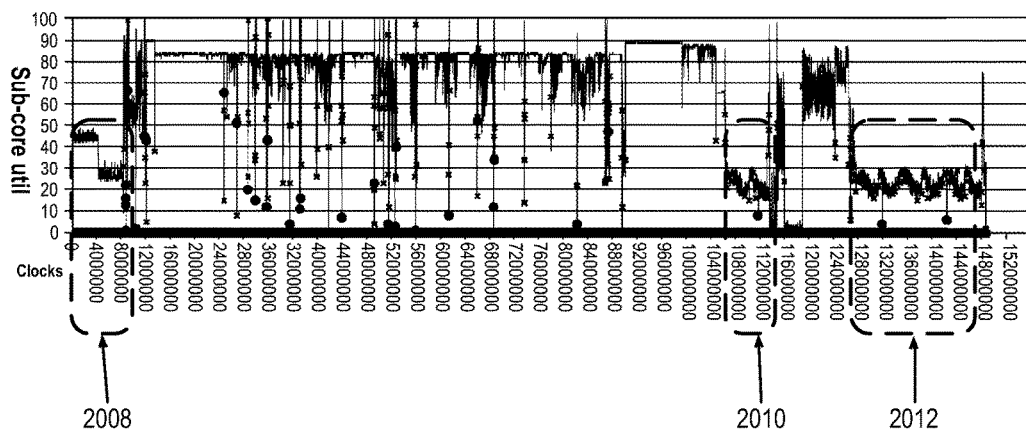

FIG. 19 and FIG. 20 are graphs of exemplary graphics sub-core utilization while processing successive frames of a 3D graphics application. The successive frames are subsequent to the frame shown in FIG. 18. While the utilization of the graphics sub-cores during the processing of the respective frames of a graphics application may not be identical, the utilization patterns may be similar. For example, graph regions 1908, 1910, and 1912 of FIG. 19 show utilization that correlates with graph regions 1808, 1810, and 1812 shown in FIG. 18. Graph regions 2008, 2010, and 2012 of FIG. 20 show utilization that correlates with graph regions 1808, 1810, and 1812 of FIG. 18, as well as graph regions 1908, 1910, and 1912 of FIG. 19. Accordingly, the exemplary graphs show that, in some embodiments, sub-core utilization follows a similar pattern across successive frames, with similar windows of high and low activity. In one embodiment, the pattern of graphics processor utilization observed across a frame is used to predict or to refine predictions of the graphics processor utilization within successive frames.

Figure 21:
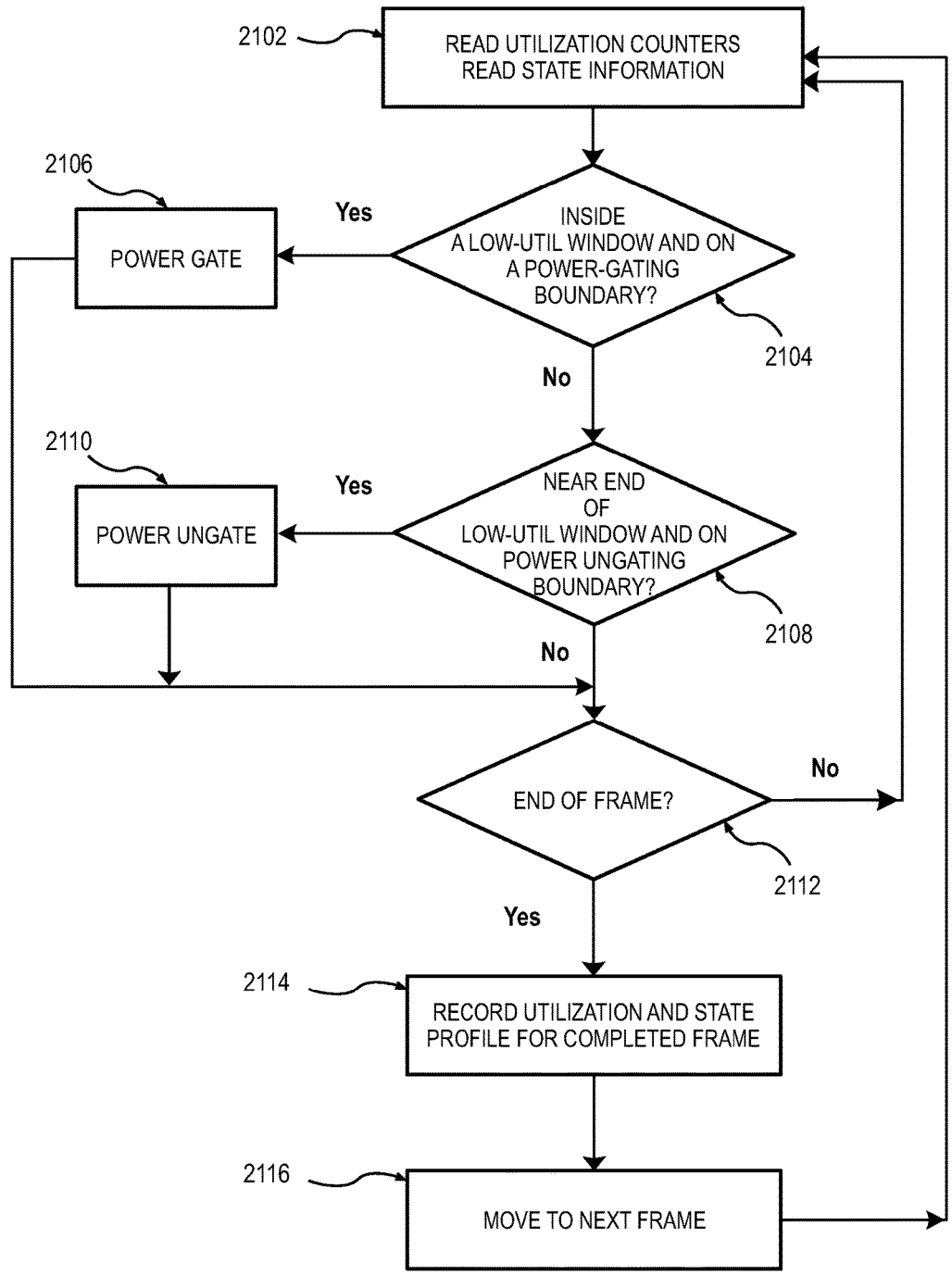
FIG. 21 is a flow diagram of logic to manage the scaling of a graphics core or sub-core, according to an embodiment.

FIG. 21 is a flow diagram of logic to manage the scaling of a graphics core or sub-core within a frame of graphics operations, according to an embodiment. The logic operations illustrated may be performed, for example, by the PCU 1140 of FIG. 12, or in combination with one or more other components within the GPU or the driver software for the GPU. In one embodiment, the logic operations are determined for the GPU as a whole, while one embodiment performs the illustrated operations on a per core or sub-core basis. The operations may repeat in regular time intervals ranging from several hundred microseconds to several milliseconds based on factors such as graphics processor type, execution frequency, and graphics workload.

At the start of each cycle, at block 2102, utilization counters are read to determine graphics core or sub-core utilization over the last time interval. In one embodiment, utilization information is recorded during the frame and windows of higher and lower utilization are identified for use in predicting utilization within in subsequent frames. While the utilization counters are read, state information can be read to determine the current position within the set of operations of the frame. Given that consecutive frames often perform similar tasks, state information such as current Batch Buffer ID number or pipeline-flush ID number recorded during previous frames can be correlated with periods of high or low utilization, then used to predict the utilization of successive frames.

Increasing the detail of the recorded state information can increase the accuracy of the utilization prediction across successive frames. However, increasing the detail of the recorded state also increases the amount of overhead required to gather, maintain, and analyze recorded state. In one embodiment, the state information is recorded by graphics driver software executing on the host system using one or more host processors. In such embodiment, a small amount of state information is recorded, producing reduced prediction accuracy at the benefit of reduced manufacturing costs for the graphics processor. In one embodiment a dedicated power management micro controller (e.g., Power microcontroller 1200 of FIG. 12) is included to read and analyze larger amounts of state information without imposing increase overhead on other processors within the system.

At block 2014 the state information is used to determine whether the the GPU is within a low-utilization window within the frame and also at a power-gating operational boundary such as, for example, a new batch buffer or pipeline flush operation. If both conditions are true the GPU may power gate one or more graphics sub-cores or graphics cores, as shown at block 2016. If one or both conditions are not true, the logic operations proceed to block 2108, where it is determined if the GPU is near the end of a period of low-utilization and also on a power ungating boundary. If the GPU is determined to be near the end of a low utilization window and on an operational boundary in which graphics processor cores or sub-cores may be ungated, the logic is configured to proceed to block 2110, in which one or more of the presently power gated cores or sub-cores are ungated. In one embodiment, even if at block 2104 it is determined that the GPU is inside a low utilization window and on a power gating boundary, the logic may also attempt to determine whether the GPU is nearing the end of the low-utilization window. In such case, the power gate operations shown at block 2106 may be bypassed.

At block 2112 the logic performs operations to determine if the GPU, core, or sub-core is at the end of a frame of graphics operations. If the frame is not complete, the logic returns to the operations illustrated at block 2102 to begin an additional cycle. In one embodiment, the logic proceeds to block 2114 to record the utilization and state profile for the completed frame that will be used to predict the utilization of the next frame or set of frames before moving to the next frame, as indicated at block 2116. The utilization and state profile may be recorded at the end of each frame and used to predict the utilization for the next frame or the next group of successive frames. In one embodiment, the utilization and state profile is recorded every interval of frames and used to predict utilization across the next interval of frames.

Thus, the illustrated logic is configurable to enable sufficient execution resources before those resources are required. GPU state information can be analyzed in light of current utilization counters and may be combined with information predicting high and low utilization windows within the current frame based on information gathered during preceding frames. Accordingly, any power-gated graphics cores or sub-cores may be re-enabled before entering a period of high utilization.

As used herein, references to one or more "embodiments" are to be understood as describing a particular feature, structure, or characteristic included in at least one implementation. Thus, phrases such as "in one embodiment" or "in an alternate embodiment" appearing herein, each describe various embodiments and implementation, and do not necessarily all refer to the same embodiment. However, they are also not necessarily mutually exclusive.

The various embodiments disclosed above related to the dynamic scaling of graphics processor resource including execution units and graphics sub-cores may find general use in integrated circuits. In one embodiment, available EUs are scaled up or down based on metrics such as the current utilization rate of the execution units and the submission of new draw calls from a graphics API, including a 3D graphics API such as OpenGL or Direct 3D. An integrated circuit apparatus such as a graphics processor can disable a portion of the EUs during of low utilization and enable the portion of EUs based on incoming events, such as the submission of graphics API calls (e.g., a draw calls). While the subset of EUs are disabled the frequency of enabled EUs can be increased without increasing the power dissipation and max current load. In one embodiment, a power control unit (PCU) couples to or integrates within the apparatus and includes logic to determine when to power gate the execution units. In one embodiment the PCU can power gate or power ungate a graphics sub-core or graphics core to disable or enable resources within the sub-core or core. In one embodiment, power gating sub-cores or cores occurs on a clean operational boundary such as a new batch buffer or pipeline flush operation. The determination of an operational boundary may be made by the GPU hardware or by a graphics driver for the GPU. The operational boundary can be determined at the time of submission of the operations to the GPU or at the time or receipt of the operation by the GPU.

One embodiment includes a system comprising a graphics processing unit (GPU). The GPU includes one or more graphics cores, where each graphics core includes an array of execution units. The system also includes a PCU coupled to the GPU. The PCU includes logic to power gate one or more execution units in the array of execution units in each graphics core when utilization of the execution units is below a first threshold. The PCU can also include logic to enable all execution units in each graphics core when the GPU receives a new graphics operation. The PCU can additionally include logic to enable one or more of the power gated execution units when the utilization is above the first threshold and to enable all execution units in each graphics core when utilization is above a second threshold. In one embodiment the first threshold is 20% and the second threshold is 60%. In one embodiment, thresholds are dynamically adjustable.

In one embodiment, the GPU includes logic, or is otherwise configured to report the utilization of the execution units. In one embodiment, the PCU is configured to monitor the GPU to determine the utilization of the execution units. In one embodiment, the GPU includes logic to enable a signal indicating that a new graphics operation has been received. The signal can be enabled each time an operation is received, or when a number of operations is received over a period of time.

In one embodiment, logic configured to monitoring the GPU comprises determining EU scaling by defining a monitor window, computing utilization statistics for the set of execution units during the monitor window, and storing the utilization statistics when the monitor window expires. In one embodiment, the logic to power gate a subset of the EUs comprises defining a decision window, retrieving the stored utilization statistics when the decision window expires, and power gating the subset of the EUs when the stored utilization statistics indicates that the utilization is below the first threshold. In one embodiment, when the utilization statistics indicates that the utilization is above the first threshold, a portion of the power gated EUs are enabled. In one embodiment, when the utilization is above a second threshold, all EUs are enabled. EU utilization for each EU may be determined by the utilization of a floating point unit (FPU) within the EU.

In one embodiment, a method for scaling graphics resources in a GPU comprises reading utilization metrics for the GPU, where the metrics include utilization data for a graphics core or sub-core of the GPU and reading graphics state information to determine a position of a current graphics operation within in a frame of graphics operations. The method further comprises power gating or power ungating the graphics core or sub-core of the GPU, where the current graphics operation is in a window of low utilization for the core or sub-core and is on an operational boundary that allows the graphics core or sub-core to be enabled or disabled. In one embodiment the operational boundary includes an operation in a new batch buffer of graphics operation or a pipeline flush operation. In one embodiment the method further comprises power ungating a graphics core or sub-core near the end of a window of low utilization. The end of the window of low utilization can be predicted based on the position of the current graphics operation within the frame of graphics operations and the utilization metrics of a previous frame of graphics operations. In one embodiment, the method further comprises completing the frame of graphics operations, storing metrics and state information for the frame; and predicting a set of utilization windows for a subsequent frame based on the stored metrics and state information.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

Various components can be a means for performing the operations or functions described. Each component described herein includes software, hardware, or a combination of these. The components can be implemented as software modules, hardware modules, special-purpose hardware (e.g., application specific hardware, application specific integrated circuits (ASICs), DSPs, etc.), embedded controllers, hardwired circuitry, etc. Besides what is described herein, various modifications can be made to the disclosed embodiments and implementations without departing from their scope. Therefore, the illustrations and examples herein should be construed in an illustrative, and not a restrictive sense. The scope and spirit of the invention should be measured solely by reference to the claims that follow.

What is claimed is:

1. An apparatus comprising:
multiple graphics execution units;
first hardware logic coupled to the multiple graphics execution units, the first hardware logic to monitor utilization including average utilization and peak utilization of the execution units during multiple monitor windows of a decision window;
second hardware logic coupled to the multiple graphics execution units, the second hardware logic to detect a graphics operation affecting multiple frames; and
third hardware logic coupled to the multiple graphics execution units, the third hardware logic to dynamically power gate a first portion of the execution units based on the peak utilization and the average utilization during at least one monitor window within a frame of the graphics operation to dynamically scale the first portion of the execution units within a first time period of the frame based on changing characteristics within the frame, wherein the first portion is power gated to ON if the peak utilization exceeds a peak utilization threshold and wherein the first portion is also power gated to ON if the average utilization exceeds an average utilization threshold.

2. The apparatus as in claim 1 wherein the third logic further to ungate the first portion of the execution units within a second time period of the frame based on approaching a change in at least one of the peak utilization and the average utilization during the frame.

3. The apparatus of claim 1 wherein the utilization of the execution units is floating point unit utilization and the graphics operation includes a draw call from a graphics programming interface.

4. The apparatus as in claim 1 wherein the third logic further to increase a clock frequency of a second portion of the execution units while power gating the first portion of the execution units and the increase in clock frequency does not increase maximum current load.

5. The apparatus as in claim 4 wherein the apparatus is a graphics processing unit including one or more sub-cores and the multiple execution units are distributed across the one or more sub-cores.

6. The apparatus as in claim 5 wherein the third logic further to power gate or power ungate a portion of the one or more sub-cores based on a first level of utilization of the sub-cores or a second level of utilization that is greater than the first level of utilization.

7. The apparatus as in claim 6 wherein the utilization of the sub-cores includes utilization for the execution units, texture processing resources, or pixel processing resources.

8. The apparatus as in claim 6 wherein the third logic to power gate or power ungate the portion of the one or more sub-cores at a boundary including a start of a new batch buffer or pipeline flush.

9. The apparatus as in claim 8 further comprising a power control unit (PCU) to power manage the one or more sub-cores, the PCU including the first, second or third logic.

10. The apparatus as in claim 9 wherein the PCU further to correlate utilization and state for the one or more sub-cores to determine utilization windows.

11. A system comprising:
a graphics processing unit (GPU) including one or more cores, each of the one or more cores including multiple sub-cores that each include execution units, the GPU to monitor utilization including average utilization and peak utilization of the execution units during multiple monitor windows of a decision window; and
a power control unit (PCU) coupled to the one or more cores, the power control unit to dynamically power gate a first portion of the execution units based on the peak utilization and the average utilization during at least one monitor window within a frame of a graphics operation to dynamically scale the first portion of the execution units within a first time period of the frame based on changing characteristics within the frame, wherein the first portion is power gated to ON if the peak utilization exceeds a peak utilization threshold and wherein the first portion is also power gated to ON if the average utilization exceeds an average utilization threshold.

12. The system of claim 11 wherein the PCU to ungate the first portion of the execution units within a second time period of the frame based on approaching a change in at least one of the peak utilization and the average utilization during the frame.

13. The system of claim 11 wherein each of the sub-cores includes a texture processing resource and execution units, the utilization of the sub-cores includes utilization of the execution units or utilization of the texture processing resource.

14. The system of claim 13 wherein the GPU to report the utilization of the sub-cores.

15. The system of claim 13 wherein the PCU to power gate one or more of the execution units based on the utilization of the execution units.

16. The system of claim 15 wherein the GPU to signal in response to a graphics operation and the PCU, in response to the signal, to power ungate all power gated execution units.

17. The system of claim 16 wherein the graphics processing unit to signal after a number of graphics operations are received within a period and the graphics operation is a draw call from a graphics programming interface.

18. A method comprising:
determining utilization including average utilization and peak utilization of execution units within a graphics processor during multiple monitor windows of a decision window;
dynamically power gating a first portion of the execution units based on the peak utilization and the average utilization during at least one monitor window within a frame of a draw call to dynamically scale the first portion of the execution units within a first time period of the frame based on changing characteristics within the frame while monitoring the graphics processor for a draw call from a graphics programming interface, wherein the first portion is power gated if the peak utilization exceeds a peak utilization threshold and wherein the first portion is also power gated if the average utilization exceeds an average utilization threshold;

ungating at least the first portion of the power gated execution units within a second time period of the frame based on the utilization including a change in at least one of the peak utilization and the average utilization during the frame; and ungating the power gated execution units in response to the draw call.

19. The method of claim 18 wherein determining utilization comprises:
defining a first timer for a monitor window;
computing utilization statistics for execution units during the monitor window; and
storing the utilization statistics in response to the first timer expiring.

20. The method of claim 19 wherein power gating the portion of the execution units comprises:
defining a second timer for the decision window;
retrieving the utilization statistics in response the second timer expiring; and
power gating the portion of the execution units based on the utilization statistics.

21. A method for scaling graphics processor resources, the method comprising:
reading, with power management hardware logic, utilization metrics including average utilization and peak utilization during multiple monitor windows of a decision window for execution units of a sub-core of the graphics processor;
reading, with the power management hardware logic, graphics state information to determine a position of a current graphics operation in a frame of graphics operations; and
dynamically power gating a first portion of the execution units of the sub-core based on the peak utilization and the average utilization during at least one monitor window within a frame to dynamically scale the first portion of the execution units within a first time period of the frame based on changing characteristics within the frame, wherein the first portion is power gated to ON if the peak utilization exceeds a peak utilization threshold and wherein the first portion is also power gated to ON if the average utilization exceeds an average utilization threshold.

22. The method of claim 21 further comprising ungating the first portion of the execution units within a second time period of the frame based on approaching a change in at least one of the peak utilization and the average utilization during the frame.

23. The method of claim 22 further comprising predicting the end of the window of low utilization using the position of the current graphics operation and the metrics of a previous frame.

24. The method of claim 21 further comprising:
completing the frame of graphics operations;
storing metrics and state for the frame; and
predicting a set of utilization windows for a subsequent frame based on the metrics and state.

25. The method of claim 21 further comprising scaling graphics processor resources by including execution resources, texture resources or pixel resources by power gating the sub-core.

* * * * *